United States Patent [19]

Cohn

[11] Patent Number: 5,122,982
[45] Date of Patent: Jun. 16, 1992

[54] CARRY GENERATION METHOD AND APPARATUS

[75] Inventor: Leonard A. Cohn, San Diego, Calif.

[73] Assignee: CHoPP Computer Corporation, La Jolla, Calif.

[21] Appl. No.: 619,741

[22] Filed: Oct. 17, 1990

Related U.S. Application Data

[63] Continuation of Ser. No. 434,467, Nov. 13, 1989, abandoned, which is a continuation of Ser. No. 162,081, Feb. 29, 1988, abandoned.

[51] Int. Cl.$^5$ .............................................. G06F 7/50
[52] U.S. Cl. ...................................................... 364/787
[58] Field of Search ......................................... 364/787

[56] References Cited

U.S. PATENT DOCUMENTS

| | | | |
|---|---|---|---|
| 4,584,661 | 4/1986 | Grundland | 364/787 |
| 4,623,981 | 11/1986 | Wolrich et al. | 364/787 |
| 4,737,926 | 4/1988 | Vo et al. | 364/787 |
| 4,764,886 | 8/1988 | Yano | 364/787 |

OTHER PUBLICATIONS

Sklansky, "An Evaluation of Several Two-Summand Binary Adders", *IRE Transactions on Electronic Computers*, Jun. 1960, pp. 213–226.
Wei, "Area-Time Optiman Adder Design", *IEEE Transactions on Computers*, vol. 39, No. 5, May 1990, pp. 666–675.
Khrapchenko, "*Asymptotic Estimation of Addition Time of a Parallel Adder*", Systems Theory Research, vol. 19, 1970, pp. 105–122.
Slansky, "Conditional-Sum Addition Logic", *IRE Transactions on Electronic Computers*, Jun. 1960, pp. 226–231.
Sinha & Srimani, "Fast Implementation of Group Carry Look-Ahead in a CMOS Adder", *IEEE Transactions on Computers*, vol. 38, No. 3, Mar. 1989, pp. 424–431.
"Fast Implementation of Group Carry Look-Ahead in a CMOS Adder", *IBM Tech. Disclosure Bulletin*, vol. 29, No. 4, Sep. 1986, pp. 1842–1845.
Weinberger, "Improved Carry-Look-Ahead", *IBM Tech. Disclosure Bulletin*, vol. 21, No. 6, Nov. 1978, pp. 2460–2461.
Ofman, "On the Algorithmic Complexity of Discrete Functions", *Soviet Physics—Doklady*, vol. 7, No. 7, Jan. 1963, pp. 589–591.
Ladner and Fischer, "Parallel Prefix Computation", *Journal of the Association for Computing Machinery*, vol. 27, No. 4, Oct. 1980, pp. 831–838.
"Pipelined Carry-Lookahead Adder for Fixed Point Arithmetic", *IBM Tech. Disclosure Bulletin*, vol. 28, No. 9, Feb. 1986, pp. 4106–4108.
Savage, "The Complexity of Computing", *A Wiley-Interscience Publication*, 1976, pp. 244–283.
R. Brent, On the Addition of Binary Numbers, IEEE Transactions on Computing, C-19, 8 (1970), pp. 758–759.
Krapchenko, "Asymptotic Estimate of Addition Time of a Parallel Adder", in *Systems Theory Research*, (A. A. Lyapunor, ed. 1967), (English trans. 1970), 104–106.
T. Herman, "Linear Algorithms That Are Efficiently Parallelized to Time O(log n)", unpublished, (Sep. 1985).
B. P. Sinha et al., "Fast Parallel Algorithms for Binary Multiplication and Their Implementation on Systolic Architectures", *IEEE Transactions on Computers*, (Mar. 1989), vol. 38, No. 3, 424–431.

*Primary Examiner*—David H. Malzahn
*Attorney, Agent, or Firm*—Davis Hoxie Faithfull & Hapgood

[57] ABSTRACT

Methods and apparatus for digital addition are disclosed in particular methods and apparatus for "carrying" in digital addition, and methods for designed carry circuits using circle and tally diagrams. A general method for creating and analyzing carry circuits is developed which not only permits the analysis of existing carry circuits such as those of the ripple-carry adder and the carry look-ahead adder; but also leads to new faster carry circuits.

32 Claims, 17 Drawing Sheets

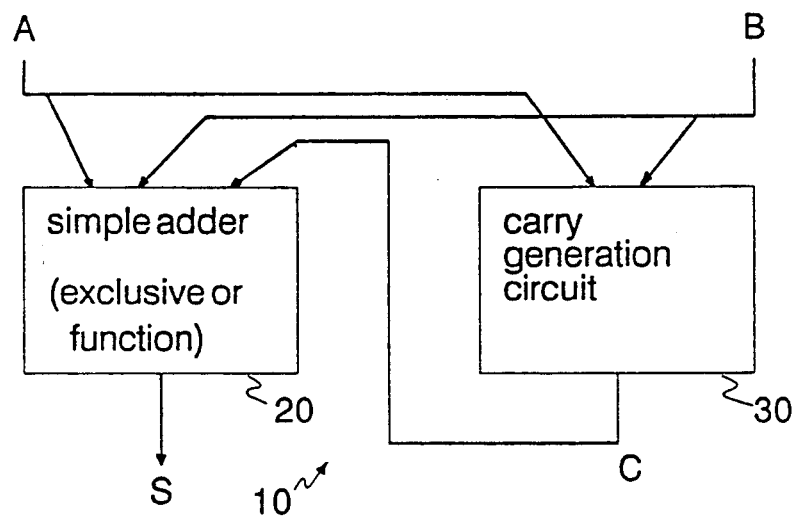
Fig. 1 *PRIOR ART*
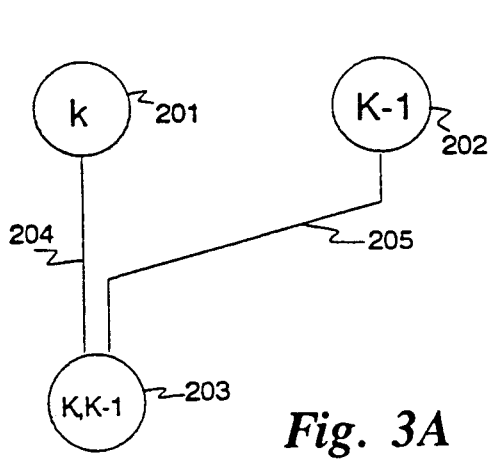
Fig. 3A
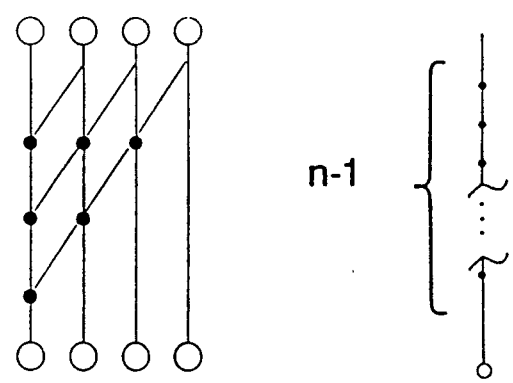
Fig. 8     Fig. 9

CARRY GENERATION METHOD AND APPARATUS

This is a continuation of copending application Ser. No. 07/434,467 filed on Nov. 13, 1989, now abandoned, which is a continuation of application Ser. No. 07/162,081 filed Feb. 29, 1988, now abandoned.

BACKGROUND OF THE INVENTION

1. Field of the Invention

This invention relates to methods and apparatus for digital addition, and in particular to methods and apparatus for "carrying" in digital addition, and a method for designing carry circuits.

2. The Prior Art

Digital addition processes must provide a method for "carrying" when the capacity of a column is exceeded. For example, in a decimal system for adding two numbers, when the result of additions in a column exceeds nine, a one must be carried to the next column. Also, for every column except the lowest ordered one, provision must be made for receiving a number carried from the preceeding lower order column. The carry operation occurs frequently in addition.

Consider adding two binary numbers, A and B. A representation of these numbers uses a subscript to denote the position or column of the bit in the number. The units position of A is $A_0$, the twos position of A is $A_1$, the fours position of A is $A_2$ the eights position of A is $A_3$, and in general, the $2^k$th position of A is denoted $A_k$. The essence of an adder is to combine the two bits $A_k$ and $B_k$ with the carry into the kth position $C_k$ from the next lower order position $k-1$ to produce the sum bit $S_k$. The sum bit is thus $$S_k = A_k \oplus B_k \oplus C_k \tag{1}$$

where $\oplus$ represents the logical EXCLUSIVE OR function. Combining $A_k$ and $B_k$ as $A_k \oplus B_k$ is straight forward, since $A_k$ and $B_k$ are immediately available. Obtaining and combining $C_k$ as required by equation (1) is more difficult since it depends on the results of all the additions of lower order bits $i < k$. Generating the carries into each position is therefore the challenge of adder design.

One of the simplest forms of adders is the ripple-carry adder in which a single carry from one column to the next is provided at each level, starting with the lowest order column. Although simple, the ripple-carry adder is relatively slow because of the relatively large number of levels or stages required. Since the circuits of one level cannot do their operations until those of the previous level have completed theirs, the time required for addition is generally determined by the number of levels.

One technique which has been employed to expedite addition separates the function of simple addition from that of the calculation of the carry bits. Probably the most common example today is the carry look-ahead adder. The standard carry look-ahead adder circuitry is obtained by considering the Boolean functions that define addition and applying a little algebra to them (see Computer System Architecture, first edition, 1976, M. Morris Mano, Prentice-Hall, pages 242-249). In this process, two Boolean terms are usually introduced, called generate and propagate. The carry look-ahead method of addition has been standard for many years with only minor changes. (See The TTL Data Book, volume 2, Texas Instruments, 1985, pages 3-721 to 3-726 and the F100K ECL Data Book, Fairchild, 1982, pages 3-146 to 3-151).

Another type of potentially fast adder circuit is the conditional-sum adder described in Conditional Sum Addition Logic by J. Sklansky, IRE Transactions on Electric Computers, Jun. 1960, pages 226-231. Two sum-and-carry pairs are computed for each column: one under the assumption that the carry into each column is zero and the other under the assumption that the carry into each column is one. In the last stage, the sums and final carries which are produced are no longer "conditional."

SUMMARY OF THE INVENTION

The approach taken by the present invention does not consider the Boolean equations that define addition, but instead uses an intuitive understanding of the generate and propagate bits: what they mean, and ways they can be combined and generalized. A general method for creating and analyzing carry circuits was developed. This method not only permits the analysis of existing carry circuits such as those of the ripple-carry adder and the carry look-ahead adder; but also leads to new carry circuits, some of which are faster than carry look-ahead circuits.

DESCRIPTION OF THE DRAWINGS

The drawings incorporate my new method[s] of graphic representation of carry circuits and depict both existing and new carry circuits, as explained in further detail below.

FIG. 1 is a block diagram of typical adder circuit.

FIG. 3A is a circle diagram in accordance with a representation method of my invention depicting a typical carry operation and circuit of the known type for an interval of width two.

FIG. 8 is a tally diagram of a four bit carry operation and circuit, corresponding to the circuit of FIG. 7.

FIG. 9 is a general tally diagram for a circle diagram circle, of n wires.

Figure 2:
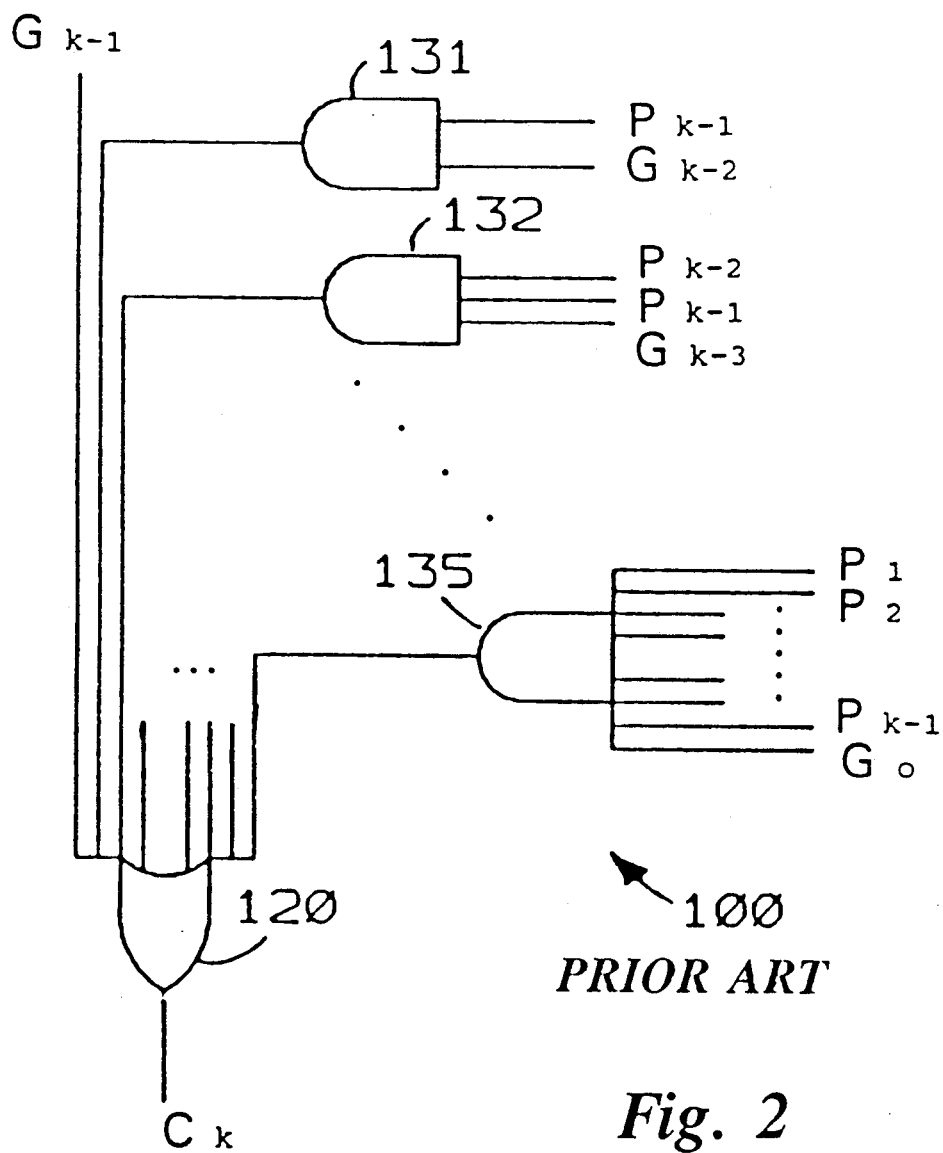
FIG. 2 is a schematic diagram of a single stage carry circuit of a known type.

Although I have described and depicted my invention in terms of positive logic with AND, OR and EXCLUSIVE OR circuits; it will be clear to those skilled in the art that other logic techniques and circuits, including but not limited to the use of negative logic components or alternating logic types from one stage to the next, can be used in implementing my invention.

The terms "position" and "column" have been used here interchangeably in references to mathematical operations.

DETAILED DESCRIPTIONS

The present invention comprises circuits for producing carry bits in a digital adder, the method of operation of such circuits, and a method for designing such circuits.

Typically, when adding A and B to determine the sum S, the carry bits $C_k$ are separately determined and then added to the values of $A_k$ and $B_k$ in the appropriate columns by a simple adder to determine the sum $S_k$. FIG. 1 is a block diagram of an adder circuit 10 comprising a simple adder 20 and a carry generate circuit 30.

In designing circuits for carry bits, two functions have been defined as the generate function and the propagate function. The generate function $G_k$ determines whether a carry is to be "generated" at a position k because of the addition in that position.

When there are only single bit inputs, a carry is generated only when both the A and B input bits are a one. This is the logical AND function:

$$G_k = (A_k \text{ AND } B_k) = A_k B_k \quad (2)$$

The propagate function $P_k$ defines whether or not a carry coming into a position k is "propagated" out of the position. A carry is propagated only when one data input (A or B) is one and the other data input is zero. This is the EXCLUSIVE OR function:

$$P_k = A_k \oplus B_k \quad (3)$$

If $G_k = 1$, then both bits are ones in column k; therefore, that column "generates" a carry into the next (k+1) column. This is true independently of whether or not there is a carry into column k from the previous column (k−1). If $P_k = 1$ and $G_k = 0$, then exactly one bit of $A_k$ and $B_k$ is a one; therefore, there is a carry into the next column (k+1) if and only if there was a carry into this column from the previous column (k−1). Thus:

$$C_{k+1} = G_k + P_k C_k \quad (4)$$

where the + symbol represents OR logic.

When $G_k = 1$, then $C_{k+1} = 1$ independent of the value of $P_k$. Thus, when $G_k = 1$, it doesn't matter what the value of $P_k$ is, one can alternately define $P_k$ as $$P_k = A_k + B_k \quad (5)$$

which is a faster function to implement in a circuit with current technology.

In the special case of k=0 (the first column), since there is no previous column, there is a carry into the next column (1) if and only if $G_0 = 1$. That is, $$C_1 = G_0 \quad (6)$$

Thus $P_0$ is not used and need not be generated.

Each initial generate and propagate bit pair created is for one column of the addition. A single column may be considered as an interval of columns where the interval is just one column long. Since columns are numbered from right to left, starting with 0, each interval of columns is designated in the form [x,y] where x is the left most column number in the interval, y the right most column number in the interval, and hence $x \geq y$. $x = y$ means the interval is only one column wide, i.e., it contains only one column, column numbered x. When we refer to combining intervals, or obtaining an interval, or producing an interval, what is meant is combining the generate and propagate bits of intervals, or obtaining the generate and propagate bits for an interval, or producing the generate and propagate bits for an interval, respectively.

After initial creation of a generate and propagate bit pair for each column, intervals are combined to obtain longer intervals. When this is done, the intervals combined are adjacent. If two intervals are combined, say [x,y] and [r,s] to form interval [x,s], then r+1=y. In fact, one could have r satisfy $x \geq r \geq y$, but this is rarely, if ever, done in practice. If three intervals [x,y], [r,s], and [a,b] are combined to form [x,b] then r+1=y and a+1=s. If four or more intervals are combined, they likewise are adjacent (again, they could overlap, but in most cases is unnecessary).

For each column c, once the interval [c,0] has been obtained, the carry into column c+1 is known. That carry is the generate bit for interval [c,0]. The adders discussed here differ from each other in how the intervals are combined to obtain the interval [c,0] for each column c.

The combining of intervals is organized in stages. The intervals produced in one stage are the intervals that are combined to form the intervals produced in the next stage. Stage zero is the initial creation for the intervals consisting of only one column each.

When considering a column c in some stage, we are considering the interval [c,x] for some x. That is, column c is the left most column under consideration and we are considering the interval produced by that stage of the form [c,x]. If we "combine" just one interval, the input for the column is [c,x] and the output for that column is also [c,x]. If we combine two intervals for column c, then one input is [c,x]. The other interval to be combined with it is [x−1,y] from column x−1, and thus the output is [c,y]. If we combine three intervals for column c, then one input is [c,x]. The next interval to be combined with it is [x−1,y] from column x−1, and the third interval combined is [y−1,z] from column y−1. The output for column c is thus [c,z]. If four or more intervals are combined for column c, then adjacent intervals are determined for combining by the same methodology.

In some practical embodiments, the fan-in of the devices used is limited to b where b represents the maximum fan-in. The number of intervals which can be combined in a single stage to produce one larger interval is limited to b.

$G_{k,k-1}$ and $P_{k,k-1}$ can now be defined for the two column interval [k,k−1]. $G_{k,k-1}$ is one if and only if there is a carry out of column k assuming there is no carry into column k−1. That is, columns k and k−1 together generate a carry out of column k if and only if $G_{k,k-1}=1$. $P_{k,k-1}$ means that if there is a carry into column k−1, then there is a carry out of column k. $G_{k,k-1}$ and $P_{k,k-1}$ can be evaluated in terms of $G_k$, $G_{k-1}$, $P_k$, and $P_{k-1}$ as follows:

$$G_{k,k-1} = G_k + P_k G_{k-1}$$

$$P_{k,k-1} = P_k P_{k-1} \qquad (7)$$

(In the equations for G, it is understood that any product of terms that involves a negative subscript is not used in the expression. In the equations for P, it is understood that any term with a negative subscript is not used in the product.)

Thus, from the functions and analysis above, we can see that a carry is produced whenever either it is generated by that column or it was generated by a previous column and propagated by all the columns in between, including the present column. Remembering that in our definition $C_k$ is the carry into a position, we see that $$C_k = G_{k-1} + G_{k-2}P_{k-1} + \qquad (8)$$

$$G_{k-3}P_{k-1}P_{k-2} + \ldots + G_0 P_{k-1} P_{k-2} \ldots P_1$$

$$C_k = \sum_{k-1}^{0} \left( G_i \prod_{i+1}^{1} P_j \right)$$

FIG. 2 is a simple and straight forward interpretation of equation (8) as a single stage carry circuit to derive $C_k$. It shows a generalized, single stage carry circuit 100 for the kth column, to produce a carry signal at the output of OR Gate 120 on the wire designated $C_k$. The generate signals from previous columns are received on the wires designated $G_0$ through $G_{k-1}$, and the propagate signals from previous columns are received on the wires $P_1$ through $P_{k-1}$. The OR gate 120 receives the generate signal from the preceding column $G_{k-1}$ and the outputs of AND gates 131, 132, . . . , 135. As indicated by the dots between the AND gates in FIG. 2 and the dots between the inputs to AND gate 135, this single stage carry circuit 100 employs k-1 AND gates with from two to k inputs. Each successive AND gate, 131, 132, . . . , 135, receives as its input the generate signal from one of the lower ordered columns $G_{k-2}$, $G_{k-3}$, . . . , $G_0$ and all of the propagate signals starting with the next higher ordered column, up to and including column k−1.

In order to better analyze and design carry circuits, I have devised two new forms of diagrammatic representation. The first type are called "circle diagrams," one of which is employed in FIG. 3A to show the columns whose generate and propagate values are combined as in equation (7) to produce the interval generate and propagate values.

Each circle in a diagram of this type is labeled with an interval. The circle represents the computation of the G and P terms for that interval. A single position, e.g., k, is considered to be an interval of length 1, e.g., [k,k]. Thus the circle 201 labeled k represents the calculations $G_k = A_k B_k$ and $P_k = A_k + B_k$, the circle 202 labeled k−1 represents the calculations $G_{k-1} = A_{k-1} B_{k-1}$ and $P_{k-1} = A_{k-1} + B_{k-1}$, and the circle 203 labeled k,k−1 represents the calculations given in equation (7).

The lines in the circle diagrams represent the wires used to transmit generate and propagate signals from the circle representing an interval on one level (i.e. stage) to an interval or intervals on the next level. In some cases, as will be described below, the propagate signal is not required and the line represents only the generate signal wire. Since the computation of $G_{k,k-1}$ and $P_{k,k-1}$ use the values $G_k$ and $P_k$, a line 204 is drawn down from the k circle to the k,k−1 circle. The computation of $G_{k,k-1}$ and $P_{k,k-1}$ also use the values $G_{k-1}$ and $P_{k-1}$, so another line 205 is drawn down from the k−1 circle to the k,k−1 circle.

In the special case of k−1=0 (the first two columns), since there is no previous column, there is a carry into the next (third) column if and only if $G_{1,0}=1$. That is, $$C_2 = G_{1,0} \qquad (9)$$

Notice $P_{1,0}$ is of no interest since there are no previous columns to create a carry for $P_{1,0}$ to propagate.

The circle 203 for interval [k,k−1] in FIG. 3A represents a logic cell of a carry circuit. The most straight forward circuit to derive generate and propagate signals for an interval [k,k−1] of width two as represented by the circle diagram of FIG. 3A is the logic cell 210 circuit of FIG. 3B. Logic cell 210 comprises AND gates 211 and 212, and OR gate 218. Additional AND gates can be employed for wider intervals. The propagate AND gate 211 AND's the propagate signals $P_k$ and $P_{k-1}$ to produce the new interval propagate signal $P_{k,k-1}$. The remaining AND gate 212, AND's the generate signal $G_{k-1}$ and the propagate signal $P_k$. The result of this, at the output of AND gate 212, and the generate signal $G_k$ are applied to the input of the OR gate 218, which produces the output $G_{k,k-1}$.

Figure 3C:
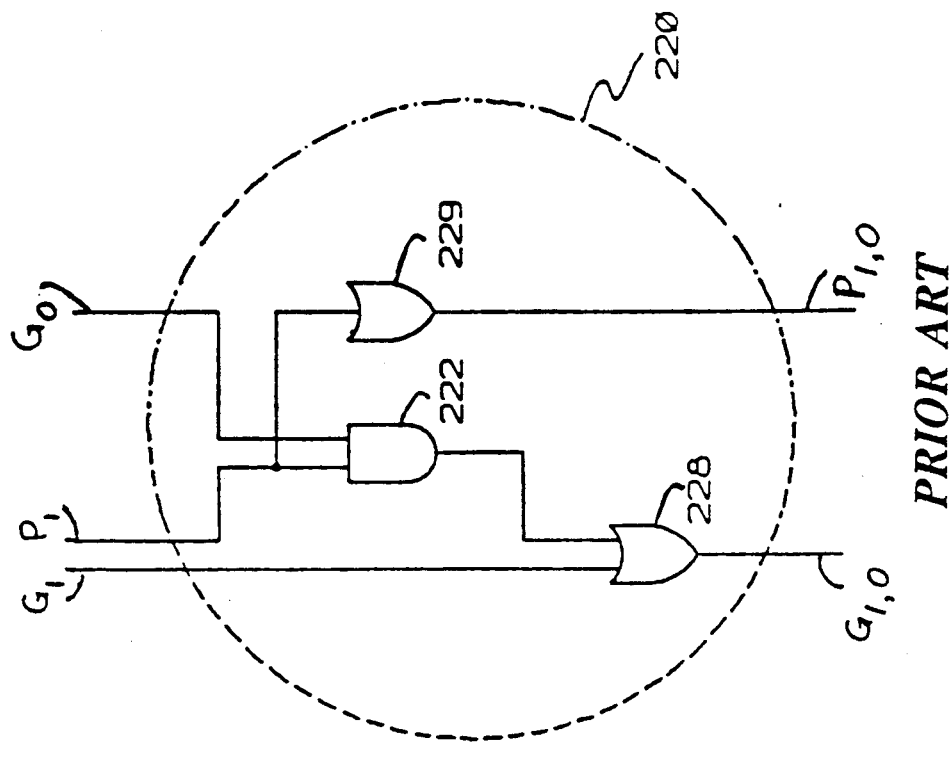
FIG. 3C is a schematic diagram of the special case of FIG. 3B where the interval starts at the lowest order column or position.
Figure 3B:
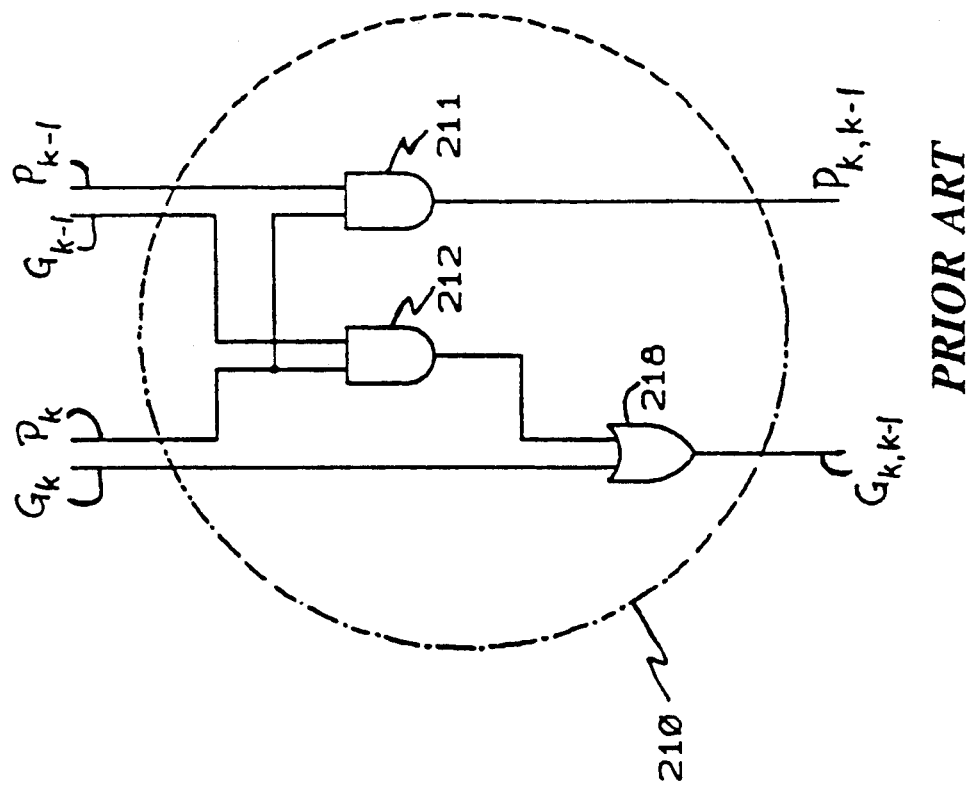
FIG. 3B is a schematic diagram of a known combinational circuit for an interval of width two, corresponding to the circle diagram of FIG. 3A.

FIG. 3C shows the corresponding circuit to FIG. 3B for the special case logic cell 220 of a two wide interval mentioned above where k−1=0. The AND gate 222 and the OR gate 228 function in the same fashion as AND gate 212 and OR gate 218 as in FIG. 3A. AND gate 211, however, is unnecessary in this special case because there is no propagate from the k−1 position. The propagate signal $P_1$ can either be transmitted, for example by the buffer OR gate 229 shown in FIG. 3B, or simply passed on by a wire in place of buffer gate 229 if fan-out of the device driving the $P_1$ line is not too great. In the special case of the one bit interval of the k=0 position, the logic cell circuit reduces to a single generate wire passing through the cell (i.e., no logical function is required), or a gate provided to regenerate the generate signal $G_0$ if necessary, for example, to control fan-out for the driving device.

Figure 4:
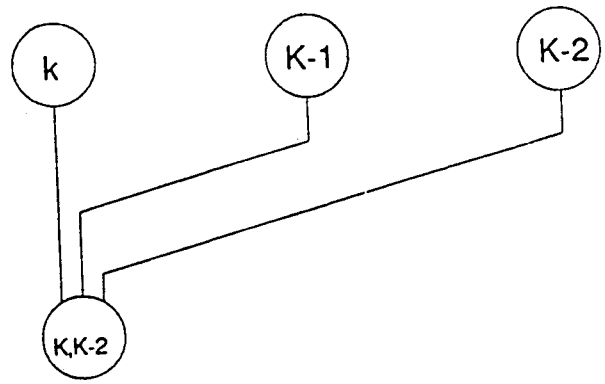
FIG. 4 is a circle diagram depicting a combinational operation and circuit for an interval of width three.

An interval of three adjacent positions k, k−1 and k−2 (denoted [k,k−2]) is depicted in the circle diagram of FIG. 4. We want $G_{k,k-2}$ to be one if and only if there is a carry out of position k assuming there is no carry into position k−2. That is, positions k, k−1, and k−2 together generate a carry out of position k if and only if $G_{k,k-2}=1$. This is true if at least one of the following three conditions is true:

$$G_k = 1$$

$$P_k = 1 \text{ and } G_{k-1} = 1$$

$$P_k = 1 \text{ and } P_{k-1} = 1 \text{ and } G_{k-2} = 1 \tag{10}$$

$P_{k,k-2}=1$ means that if there is a carry into position k−2, then there is a carry out of position k. Hence $P_{k,k-2}=1$ if and only if $P_k=1$, $P_{k-1}=1$, and $P_{k-2}=1$. Thus, $$G_{k,k-2} = G_k + P_k G_{k-1} + P_k P_{k-1} G_{k-2}$$

$$P_{k,k-2} = P_k P_{k-1} P_{k-2} \tag{11}$$

The circuit diagram of the logic cell for the three bit wide interval [k,k−2] can be drawn in a similar fashion to those of the logic cells 210 and 220 depicted in FIGS. 3B and 3C.

In the special case of the logic cell for the three bit wide interval where k−2=0 (the low order three columns of a carry circuit), there are no previous columns. There is a carry into the next (fourth) column if and only if $G_{2,0}=1$. This is, $$C_3 = G_{2,0} \tag{12}$$

Notice that $P_{2,0}$ is of no interest since there are no previous columns to create a carry for $P_{2,0}$ to propagate.

This analysis can be generalized by considering an interval of j+1 adjacent positions: k, k−1, k−2, ..., k−j (denoted [k,k−j]). $G_{k,k-j}$ is defined as one if and only if there is a carry out of position k assuming there is no carry into position k−j. $P_{k,k-j}=1$ is defined to indicate that if there is a carry into position k−j, then there is a carry out of position k. Then $$G_{k,k-j} = \sum_{i=k-j}^{k} \left( G_i \prod_{l=i+1}^{k} P_l \right) \tag{13}$$

$$P_{k,k-j} = \prod_{l=k-j}^{k} P_l$$

In the special case of k−j=0, (the first k+1 columns), since there are no previous columns, there a carry into the (k+1) column if and only if $G_{k,0}=1$. This is $$C_{k+1} = G_{k,0} \tag{14}$$

Notice that $P_{k,0}$ is of no interest since there are no previous columns to create a carry for $P_{k,0}$ to propagate. The general case of a logic cell for the interval [k, k−j] is represented by logic cell 410 in FIG. 5. As in the case of logic cell 210 of FIG. 3B, logic cell 410 comprises a plurality of AND gates 411, 412 ... 416, 417 and one OR gate 418. The propagate AND gate 411 AND's the propagate signals $P_k ... P_{k-j+1}$ to produce the new interval propagate signal $P_k$, k−j. The other AND gates 412 ... 416, 417 are generate AND gates. Each AND's an incoming generate signal with all the higher ordered incoming propagate signals (for example, $P_k$ and $G_{k-1}$ in the case of AND gate 417). The outputs of the generate AND gates 412 ... 416, 417 and the generate signal $G_k$ are applied to the input of the OR gate 416, which produces the output interval generate signal $G_{k,k-j}$.

Since the special case of k−j=0 determines the carry $C_{k+1}$, it is central to producing add circuits. Indeed, if $G_{k-1,0}$ is determined for each k, then all $C_k$ values are known and the sums $S_k$ are easily determined as $A_k \oplus B_k \oplus C_k$.

Figure 5:
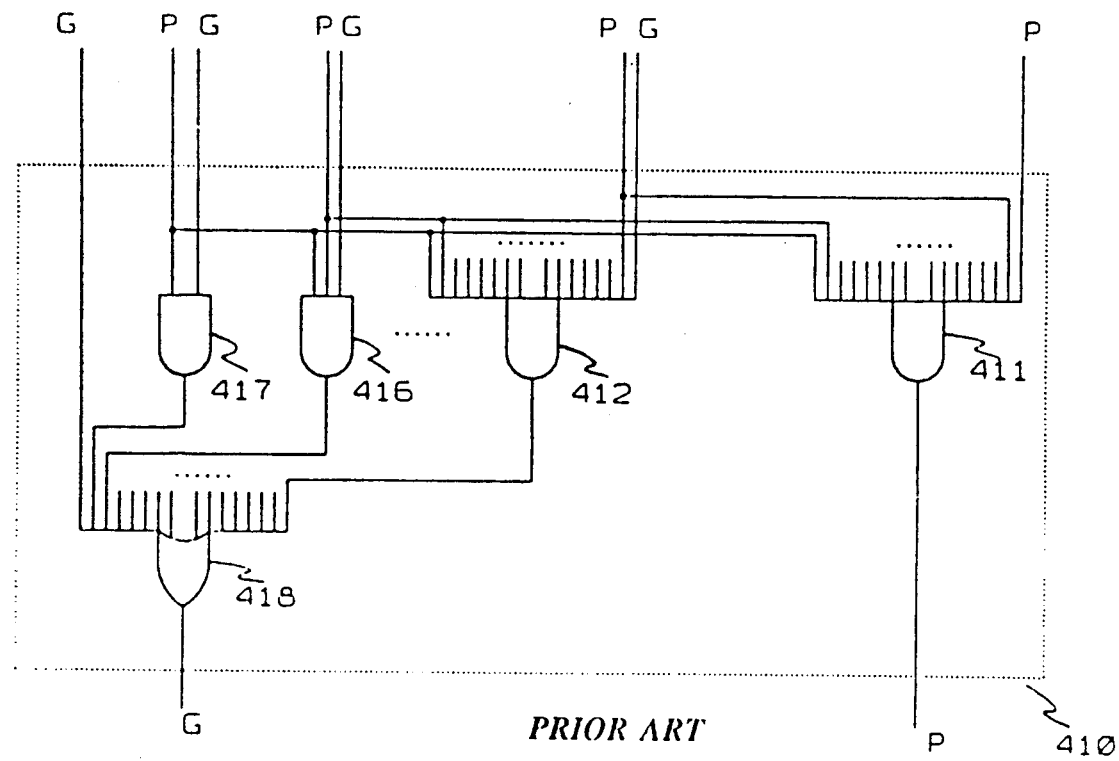
FIG. 5 is a schematic diagram depicting the general case of a logic cell.
Figure 6:
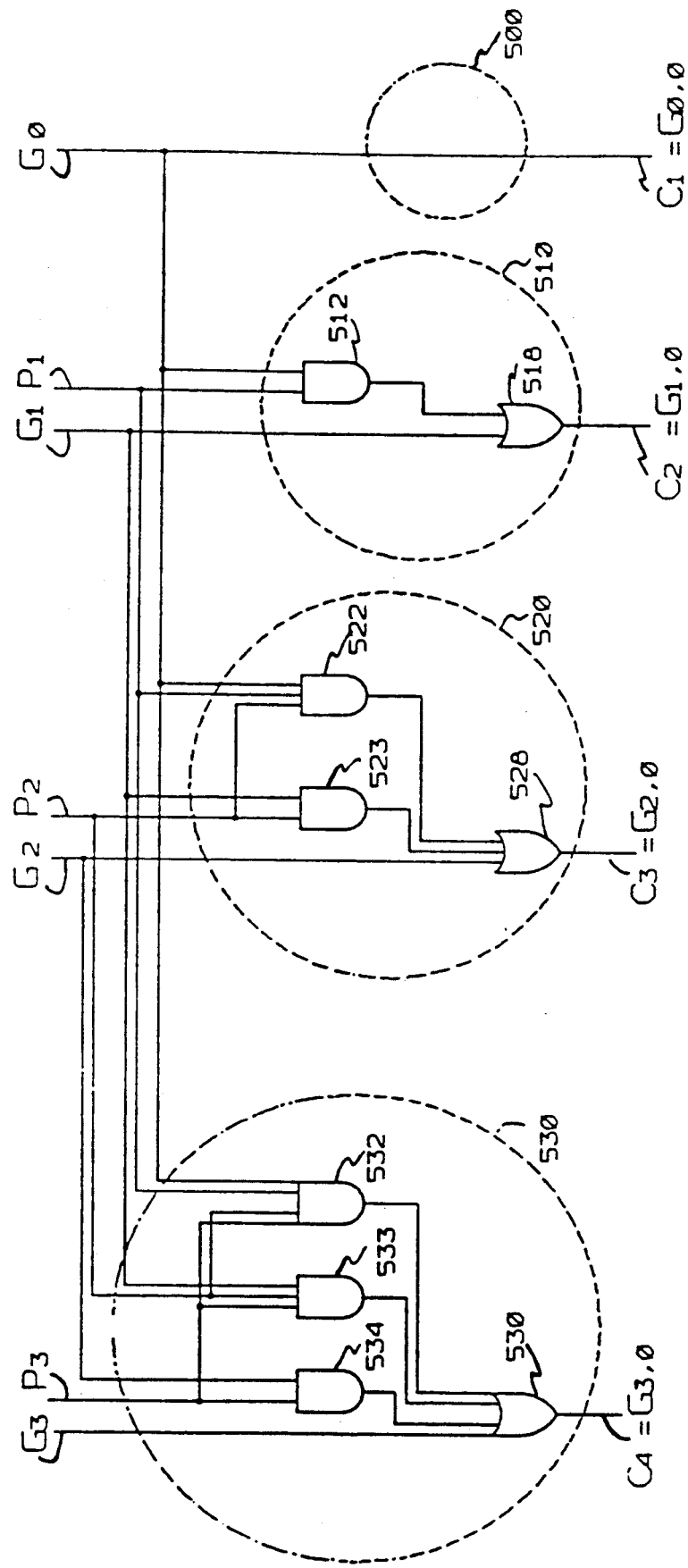
FIG. 6 is a schematic diagram depicting a typical combinational single stage carry operation and circuit of a known type, organized as logic cells.

A four bit carry circuit can be made by connecting one bit, two bit, three bit, and four bit versions of the generalized carry circuit from FIG. 5 as shown in FIG. 6. Propagate output signals are not needed in this case because only the final carry signals $C_{k+1}=G_{k,0}$ are to be produced. The single bit version in bit position 0 is further simplified by eliminating the unneeded OR gate corresponding to OR gate 418 of FIG. 5. This circuit of FIG. 6 is a representation of a straight forward four bit carry generation circuit.

Figure 7:
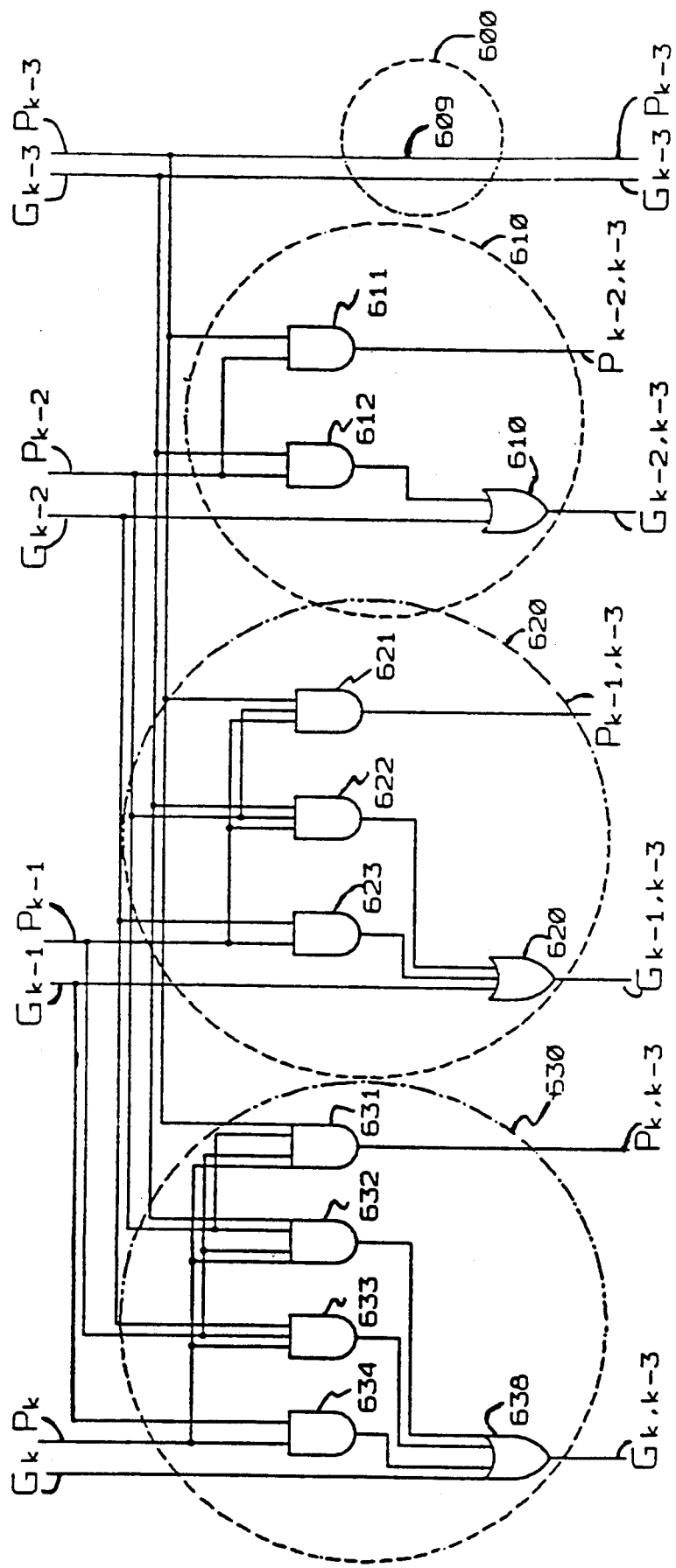
FIG. 7 is a schematic diagram for a simple four bit carry operation and circuit similar to that of FIG. 6, organized as a group for use in a larger circuit.

I have developed a second form of diagrammatic representation notation, called a tally diagram, which aids in explaining and creating the novel carry circuits of my invention, as well as giving further insight into existing carry circuits. FIGS. 6-8 show the steps in developing this notation.

First, the four bit circuit of FIG. 6 is redrawn as shown in FIG. 7, to transform it into a four bit group 500 that could appear within a large circuit. Because the group 500 is now within a larger circuit, there are expected to be bit positions of lower order than those of the group 500. Thus, the propagate input signal for the low order position and the propagate output signals, which could be eliminated in the case of FIG. 6, cannot be eliminated.

Second, AND gates 611, 621 and 631 are added to each of the other three positions to produce an interval propagate signal corresponding to the interval generate signal already shown being produced by the OR gates 618, 628, 638 in each of the three positions. (In the low order position, the propagate signal is simply passed through by a wire 609). Thus, the features of the general logic cell case of FIG. 5 are employed. Labeling our high order position as k we now have four pairs of interval generate and interval propagate signals $G_{k,k-3}P_{k,k-3}$, $G_{k-1,k-3}P_{k-1,k-3}$, $G_{k-2,k-3}P_{k-2,k-3}$ and $G_{k-3}P_{k-3}$.

The first notational simplification is made by noticing that generate and propagate always appear in pairs, except in some circumstances (such as the case of FIG. 6) where the propagate signal is not needed. A single line, therefore, is used to designate each pair.

The second notational simplification reduces the number of lines coming into a circle by bringing the horizontal lines representing generate-propagate pairs directly into a single vertical line and indicating the connection with a dot. The actual number of generate-propagate pairs entering a circle is computed as one pair for the vertical line shown and one for each dot shown on the vertical line. Note that we do not put a dot where the horizontal generate-propagate pair originates. This dot notation is a unique usage differing from traditional usage.

The third and final simplification is to eliminate the circuit in the circle because its exact structure is implied by the number of pairs entering the circle and the fact that the circle produces a generate-propagate pair as output except for those positions where it is unnecessary to produce the propagate signal. (See rule 8 below).

FIG. 8 shows the simplified four bit group of FIG. 7 in the new tally diagram notation. This tally diagram contains all the information necessary for producing an actual carry generation circuit. The tally diagram can be used to show some known circuits (carry look ahead and ripple carry) as well as all of the circuits of our invention. The following rules describe how circuits are represented by the tally diagrams and how their characteristics can be examined.

1. Each circle represents a circuit module.
2. Lines represent groups of wires.
3. The actual circuit represented by a circle is determined by the number of generate-propagate pairs entering the circle and by the rule 8 below, that specifies when some propagate signals are unnecessary.
4. Except when propagate signals are unnecessary, under rule 8, circles with the same number of signals entering, represent identical circuits.
5. The general tally diagram for a circle of n incoming generate-propagate intervals where $n > 1$, with a logic cell of the general type shown in the diagram of FIG. 5, is shown in FIG. 9.
6. Where n is one, the circuit may be NULL and the generate and propagate signals are passed directly through (however, a regeneration circuit may be used in conjunction with rule 7.)
7. In order to handle fan-out into later stages, a regeneration circuit may be placed at any output, including circuits where $n=1$ and only straight through wires otherwise are needed.
8. If any circuit is producing generate and propagate for an interval whose low order position is zero, the internal propagate signal need not be produced since there is no need for it in propagating a lower order generate (there can be none since zero is the lowest). Thus, the final stage which produces the actual carry bits corresponding to intervals [k,0] need not produce any propagate signal.

If the numbers to be added have many columns, it is impractical to implement the above equations for $G_{k,0}$ directly. This is because the number of terms in the summation is also the number of signals that must be combined in an "OR" gate and the number of terms in the product is also the number of signals that must be combined in an AND gate. There are technological limits as to how many signals can be combined together in these gates. Thus, the $G_{k,0}$ values need to be obtained in stages rather than directly.

In order to determine the $G_{k,0}$ values in stages, consider how to combine the interval [r,s] with the interval [s−1,t] to obtain the interval [r,t]. That is, we wish to express $G_{r,t}$ and $P_{r,t}$ in terms of $G_{r,s}$, $G_{s-1,t}$, $P_{r,s}$, and $P_{s-1,t}$. (Note, $G_{k,k} = G_k$ and $P_{k,k} = P_k$.)

$$G_{r,t} = G_{r,s} + P_{r,s} G_{s-1,t}$$

$$P_{r,t} = P_{r,s} P_{s-1,t} \qquad (15)$$

This is a generalization of equation (7). Likewise, more than two intervals can be combined at once. As an example, consider three intervals defined by [r,s] [s−1,t] and [t−1,u]. The equations to combine these intervals is given in equation (16):

$$G_{r,u} = G_{r,s} + P_{r,s} G_{s-1,t} + P_{r,s} P_{s-1,t} G_{t-1,u}$$

$$P_{r,u} = P_{r,s} P_{s-1,t} P_{t-1,u} \qquad (16)$$

This is a generalization of equation (11).

From this it can be seen that any way of combining intervals so that all $G_{k,0}$ are obtained produces a circuit that extracts all the carries and is therefore the essence of a carry circuit.

By combining intervals in various ways in accordance with the teaching of my invention, one obtains add circuits with different properties. Thus, circuits with a preferred balance of various properties such as speed, circuit element limitations (e.g., fan-in, fan-out), material limitations (e.g., number of gates, number of wires), size, etc., can be obtained. Existing carry circuits are analyzed in accordance with my method and several examples of new carry circuits are discussed below.

Analysis A

For each k form $$G_{k,0} = G_k + P_k G_{k-1,0} \qquad (17)$$

Figure 10:
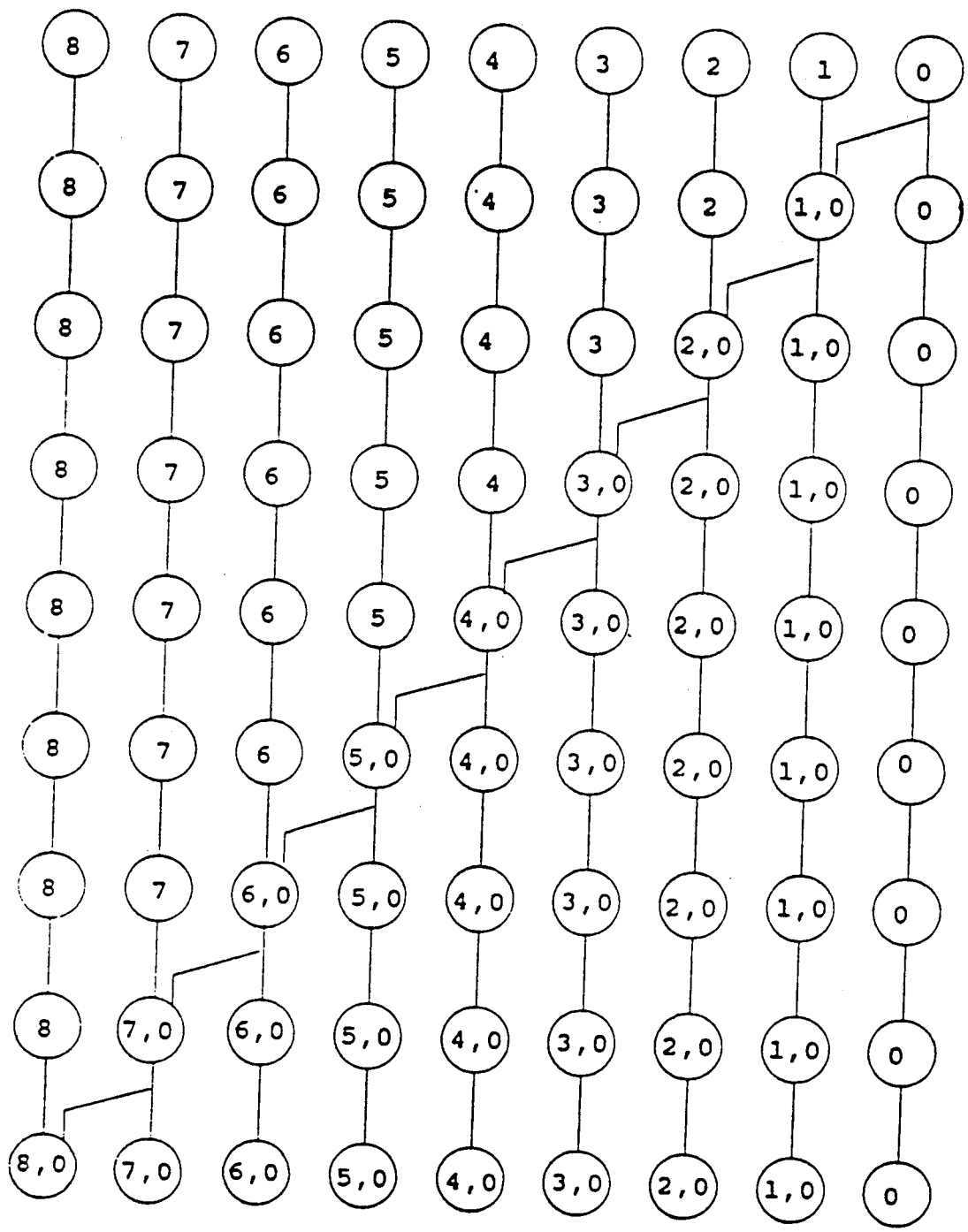
FIG. 10 is a circle diagram depicting the operation and circuit of both the known ripple-carry and serial carry circuits, as discussed in Analysis A.

Equation (17) can be derived from equations (4) and (14). This organization, depicted in the circle diagram of FIG. 10, corresponds to both the traditional ripple-carry adder and the one stage serial adder where the addend bits are presented serially and, by feeding back, the carry sum bits are produced serially. Note that, while circles are shown in each of the columns for each of the stages, it is not necessary to provide logical operations in all of the locations corresponding to the circles. Logical operations occur only in the first stage and one column in each succeeding stage. That is at the first position in each column representing an interval greater than one: [1,0] ... [8,0]. A single latching means or the equivalent can be and—in practice—is ordinarily employed where FIG. 9 shows a series of two or more circles without logical functions.

Analysis B

Figure 11:
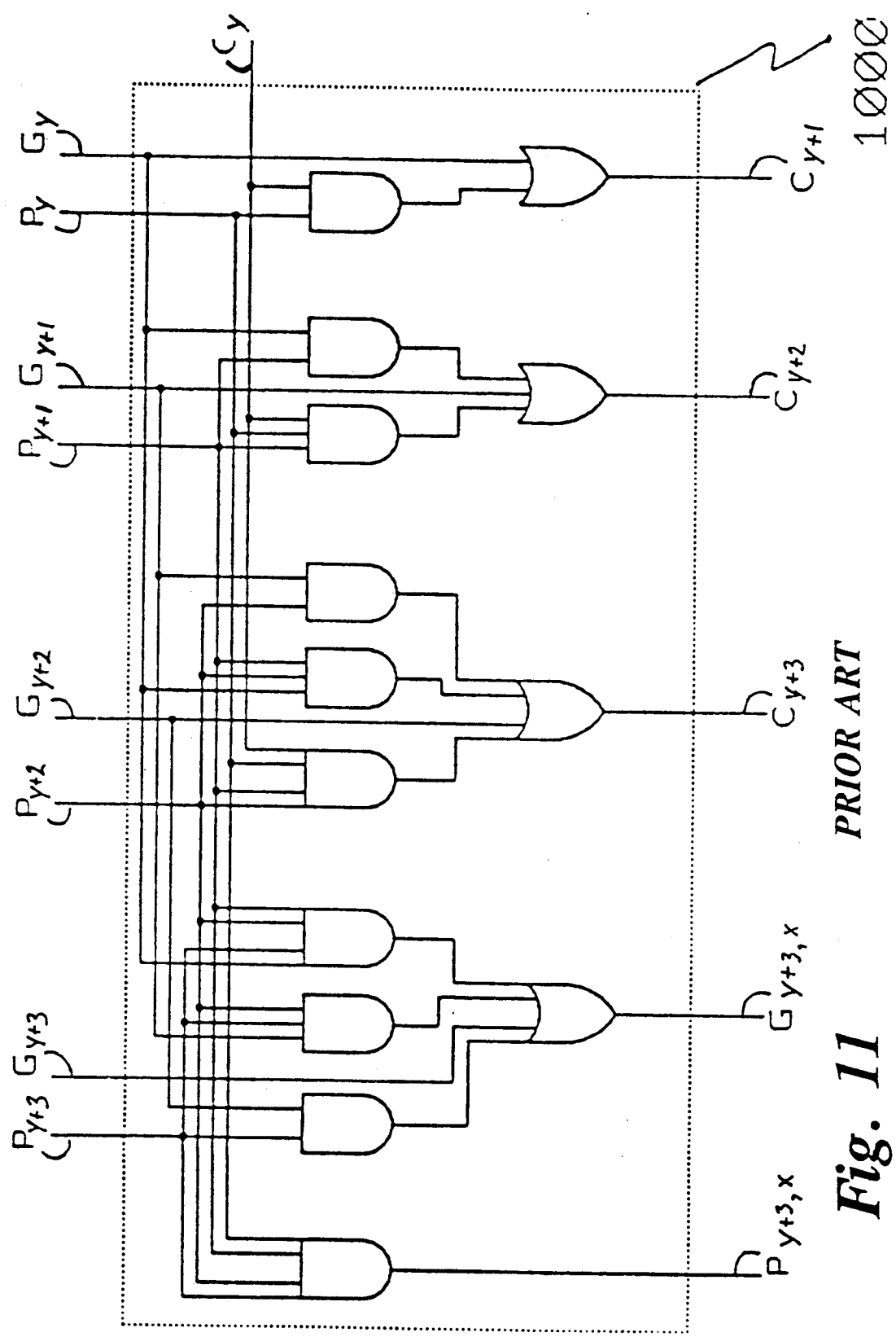
FIG. 11 is a schematic diagram of a known four bit carry look-ahead module.
Figure 12:
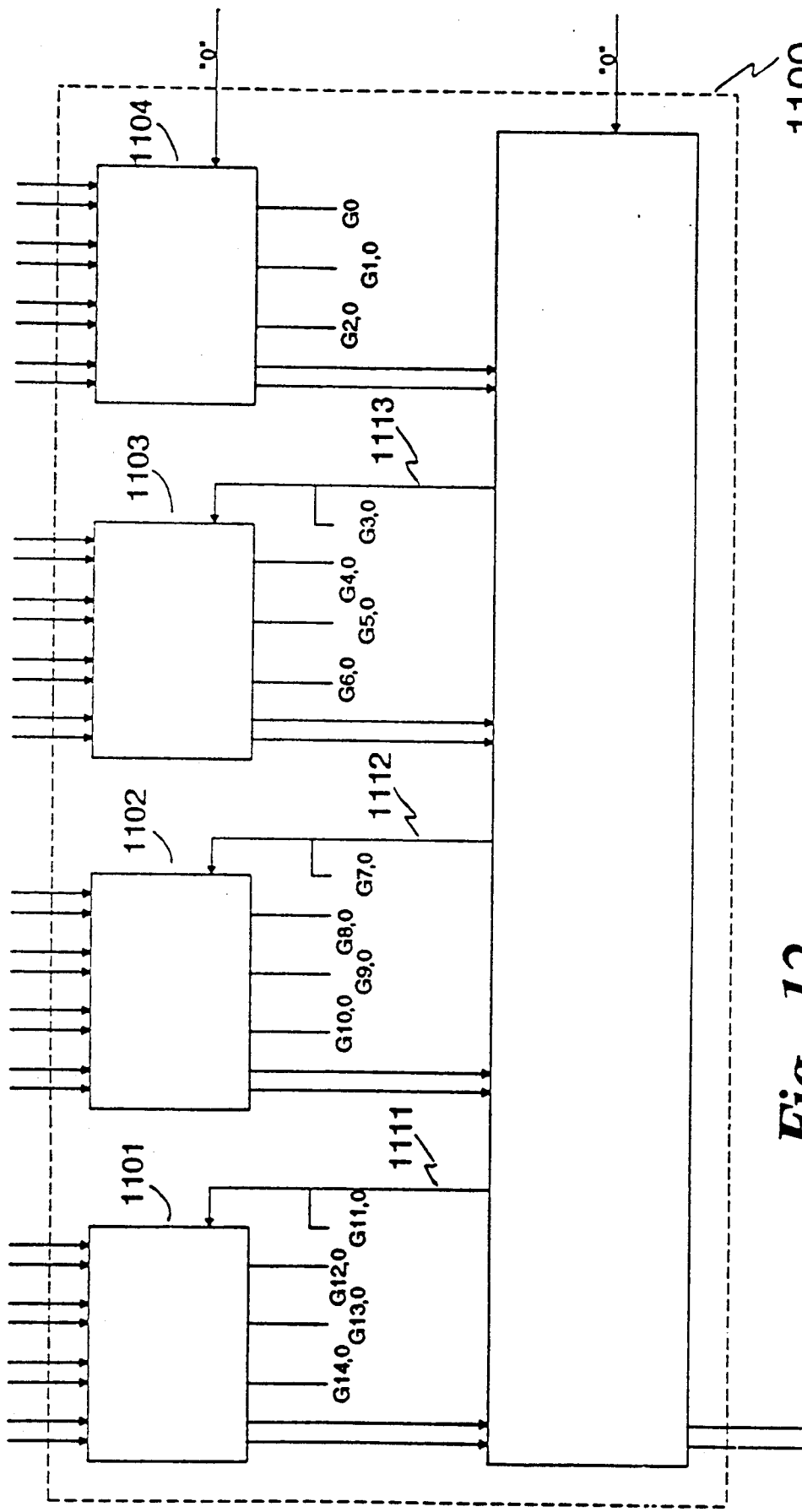
FIG. 12 is a schematic block diagram of a 16 bit carry look-ahead circuit using the modules of FIG. 11.
Figure 13A:
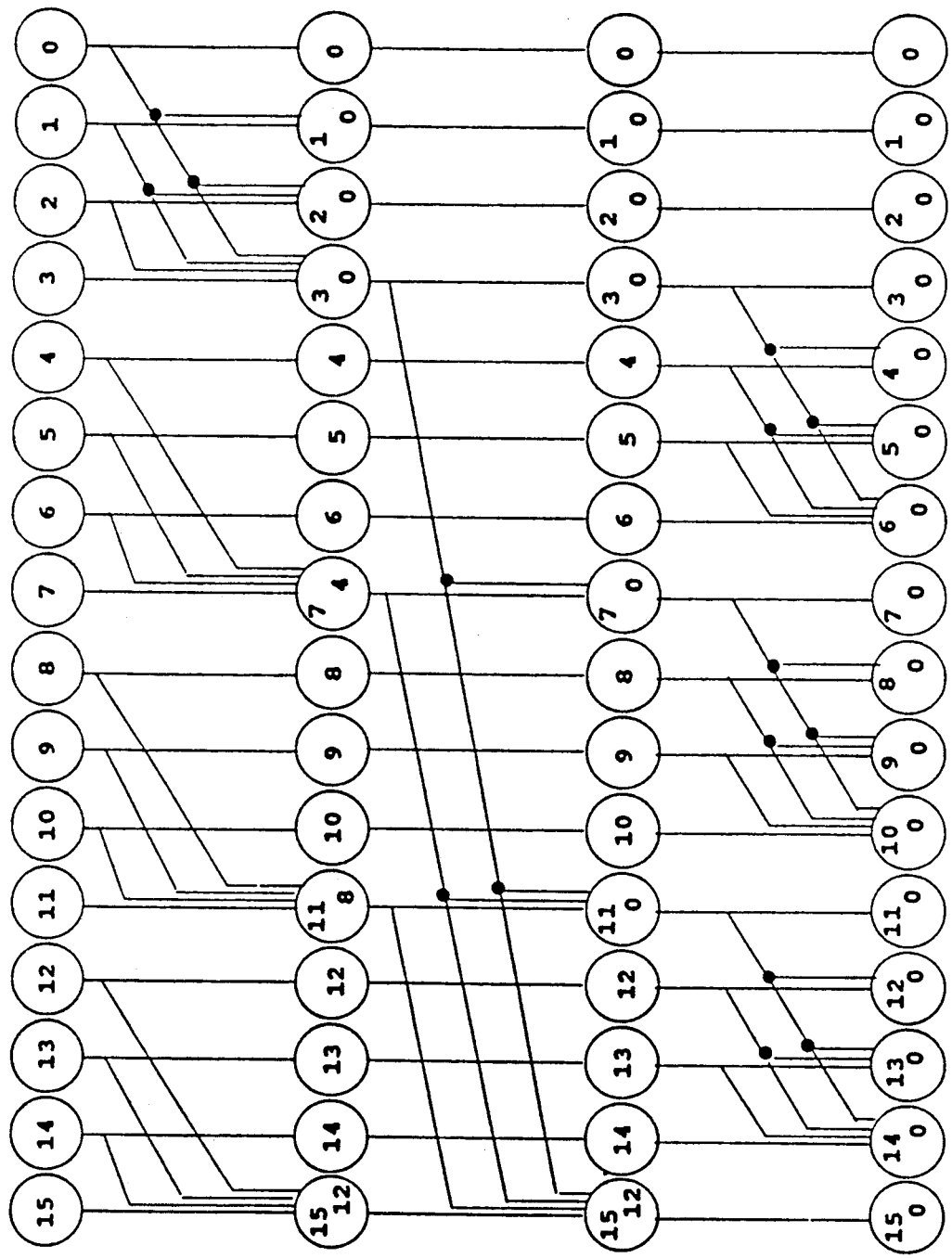
FIGS. 13A and 13B are circle and tally diagrams for a carry look-ahead circuit, as discussed in Analysis B.
Figure 13B:
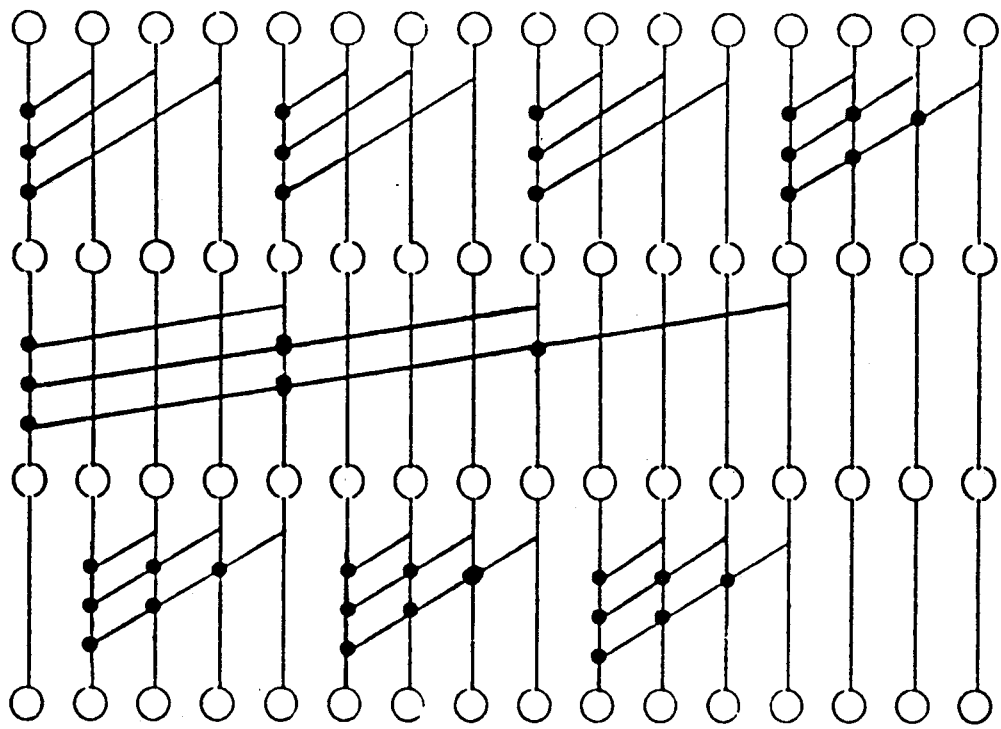

The method of the present invention can be used to analyze carry look-ahead circuits of the known type. Since the carry look-ahead circuit is not characterized by a simple expression as is the ripple-carry adder of Analysis A, a particular instance of the carry look-ahead adder is considered. This example is the carry circuit for adding two 16 bit numbers. Further, in this example, the fan-in is limited to four, so no interval is formed from more than four other intervals and the fan-out is also limited to four, so no interval is used to form more than four intervals in the next stage. FIG. 11 is a schematic diagram of a typical carry look-ahead generator circuit 1000. This circuit typically is used repeatedly in a modular fashion to form carry circuits of any desired size. FIG. 12 shows how modules 1101-1105, like circuit 1000, can be used to form a 16 bit adder 1100. While at first glance FIG. 12 appears to depict two levels or stages, there are in fact three stages because signals are returned on 1111-1113 by module 1105 of the second stage to three modules 1101-1103 of the first stage. In FIG. 12, the lines labeled as carries in FIG. 11 have been relabeled as generates for intervals to obtain for this adder the equations those developed above. The circle diagram for this carry circuit is shown in FIG. 13A and the corresponding tally diagram is shown in FIG. 13B. The equations are set forth below:

Stage 1

$$G_{1,0} = G_1 + P_1 G_0$$

$$G_{2,0} = G_2 + P_2 G_1 + P_2 P_1 G_0$$

$$G_{3,0} = G_3 + P_3 G_2 + P_3 P_2 G_1 + P_3 P_2 P_1 G_0$$

$$G_{7,4} = G_7 + P_7 G_6 + P_7 P_6 G_5 + P_7 P_6 P_5 G_4$$

$$P_{7,4} = P_7 P_6 P_5 G_4$$

$$G_{11,8} = G_{11} + P_{11} G_{10} + P_{11} P_{10} G_9 + P_{11} P_{10} P_9 G_8$$

$$P_{11,8} = P_{11} P_{10} P_9 P_8$$

$$G_{15,12} = G_{15} + P_{15} G_{14} + P_{15} P_{14} G_{13} + P_{15} P_{14} P_{13} G_{12}$$

$$G_{15,12} = P_{15} P_{14} P_{13} G_{12}$$

Stage 2

$$G_{7,0} = G_{7,4} + P_{7,4} G_{3,0}$$

$$G_{11,0} = G_{11,8} + P_{11,8} P_{7,4} G_{3,0}$$

$$G_{15,0} = G_{15,12} + G_{11,8} + P_{15,12} P_{11,8} G_{7,4} + P_{15,12} P_{11,8} G_{7,4} + P_{15,12} P_{11,8} P_{7,4} G_{3,0}$$

Stage 3

$$G_{4,0} = G_4 + P_4 G_{3,0}$$

$$G_{5,0} = G_5 + P_5 G_4 + P_5 P_4 G_{3,0}$$

$$G_{6,0} = G_6 + P_6 G_5 + P_6 P_5 G_4 + P_6 P_5 G_{3,0}$$

$$G_{8,0} = G_8 + P_8 G_{7,0}$$

$$G_{9,0} = G_9 + P_9 G_8 + P_9 P_8 G_{7,0}$$

$$G_{10,0} = G_{10} + P_{10} G_9 + P_{10} P_9 G_8 + P_{10} P_9 P_8 G_{7,0}$$

$$G_{12,0} = G_{12} + P_{12} G_{11,0}$$

$$G_{13,0} = G_{13} + P_{13} G_{12} + P_{13} P_{12} G_{11,0}$$

$$G_{14,0} = G_{14} + P_{14} G_{13} + P_{14} P_{13} G_{12} + P_{14} P_{13} G_{11,0}$$

Analyses A and B show that the two circuits that are most widely used commercially are particular cases that can be described by the general method which I have discovered.

EXAMPLE 1

This example is a new carry circuit that is faster than the carry look-ahead circuit of Analysis B for addition of numbers more than eight bits wide. This example has the same fan-in and fan-out restrictions as the known carry look-ahead of Analysis B circuit and thus is a practical circuit for addition of numbers more than several bits wide. The general form for each stage can be determined from the circle diagram of FIG. 14A and the tally diagram of FIG. 14B, and the following equations for this example can be determined from inspection of either of these diagrams:

Stage 1

$$G_{k,k-3} = G_k + P_k G_{k-1} + P_k P_{k-1} G_{k-2} + P_k P_{k-1} P_{k-2} G_{k-3}$$

$$P_{k,k-3} = P_k P_{k-1} P_{k-2} P_{k-3}$$

Stage 2

$$G_{k,k-15} = G_{k,k-3} + P_{k,k-3} G_{k-4,k-7} + P_{k-3} P_{k-4,k-7} G_{k-8,k-11} + P_{k,k-3} P_{k-4,k-7} P_{k-8,k-11} G_{k-12,k-15}$$

$$P_{k,k-15} = P_{k,k-3} P_{k-4,k-7} P_{k-8,k-11} P_{k-12,k-15}$$

Note that for the lower order positions (0–3 in Stage 1 and 0–11 in Stage 2, these equations produce some negative subscripts. Terms having negative subscripts are ignored.

Notice that this new carry circuit only requires two stages for addition of two 16 bit numbers and a fan-in and fan-out of 4; whereas, the known carry look-ahead circuit for addition of the same numbers and having the same fan-in and fan-out, analyzed in Analysis B above, required three stages. In general, where N is the number of bits to be added and b is the maximum fan-in permitted, the carry look-ahead needs $2\text{ceil}[\log_b N] - 1$ stages while the new carry circuit of this example needs only $\text{ceil}[\log_b N]$ stages, where "ceil[x]" is the integer ceiling. That is ceil[x] is the smallest integer not less than x. V. M. Khrapchenko, "Asymtotic Estimate of Addition Time of a Parallel Adder," in *Systems Theory Research* (A. A. Lyapunor, ed. 1967) (English trans. 1970) 105 has shown that this is the smallest number of possible stages; however, that paper did not provide any practical example of how the minimum number of stages might be accomplished.

The next stage, incorporation of which permits addition of numbers up to 64 bits wide in accordance with this Example 2, is defined as follows:

Stage 3

$$G_{k,k-63} = G_{k,k-15} = P_{k,k-15} G_{k-16,k-31} + P_{k,k-15} P_{k-16,k-31} G_{k-32,k-47} + P_{k,k-15} P_{k-16,k-31} P_{k-32,k-47} G_{k-48,k-63}$$

$$P_{k,k-63} = P_{k,k-15} P_{k-16,k-31} P_{k-32,k-47} P_{k-48,k-63}$$

The general form for additional stages in accordance with this example of my invention is:

Stage i $$G_{k,k-(4i-1)} = G_{k,k(4i-1-1)} + P_{k,k-(4i-1-1)}$$
$$G_{k-(4i-1),k-(2 \cdot 4i-1-1)} + P_{k,k-(4i-1} -1)P_{k-(4i-1),k-(2 \cdot 4i-1 -1)}$$
$$G_{k-(2 \cdot 4i-1),k-(3 \cdot 4i-1 -1)}$$
$$+ P_{k,k-(4i-1-1)} P_{k-(4i-1),k-(2 \cdot 4i-1-1)}$$
$$P_{k-(2 \cdot 4i-1),k-(3 \cdot 4i-1-1)} G_{k-(3 \cdot 4i-1), k-(4i-1)}$$

$$P_{k,k-(4i-1)} = P_{k,k-(4i-1-1)}$$
$$P_{k-(4i-1),k-(2\cdot 4i-1-1)}$$
$$P_{k-(2\cdot 4i-1),k-(3\cdot 4i-1-1)}, P_{k-(3\cdot 4i-1),k-(4i-1)}$$

Note that, a comparison of the 2ceil[$\log_b N$]−1 limit of the carry look-head carry circuit with the ceil[$\log_b N$] limit of my new fast carry circuit of this example indicates that the speed advantage of the new carry circuit of this example continues to improve as the width of the numbers to be added increases. For example, the carry circuit in accordance with this Example 2 requires only three stages for the addition of two 64 bit wide numbers, whereas the known carry look-ahead circuit analyzed in Analysis B and having the same fan-in and fan-out would require 5 stages.

There is, of course, a trade-off between the speed provided and space occupied by carry circuits. For example, the new carry circuits of this Example 4 require many more gates and wires than the carry look-ahead circuit does. As higher levels of circuit integration are attained and other progress is made in semiconductor technology; however, this is not a serious handicap.

EXAMPLE 2

Figure 14A:
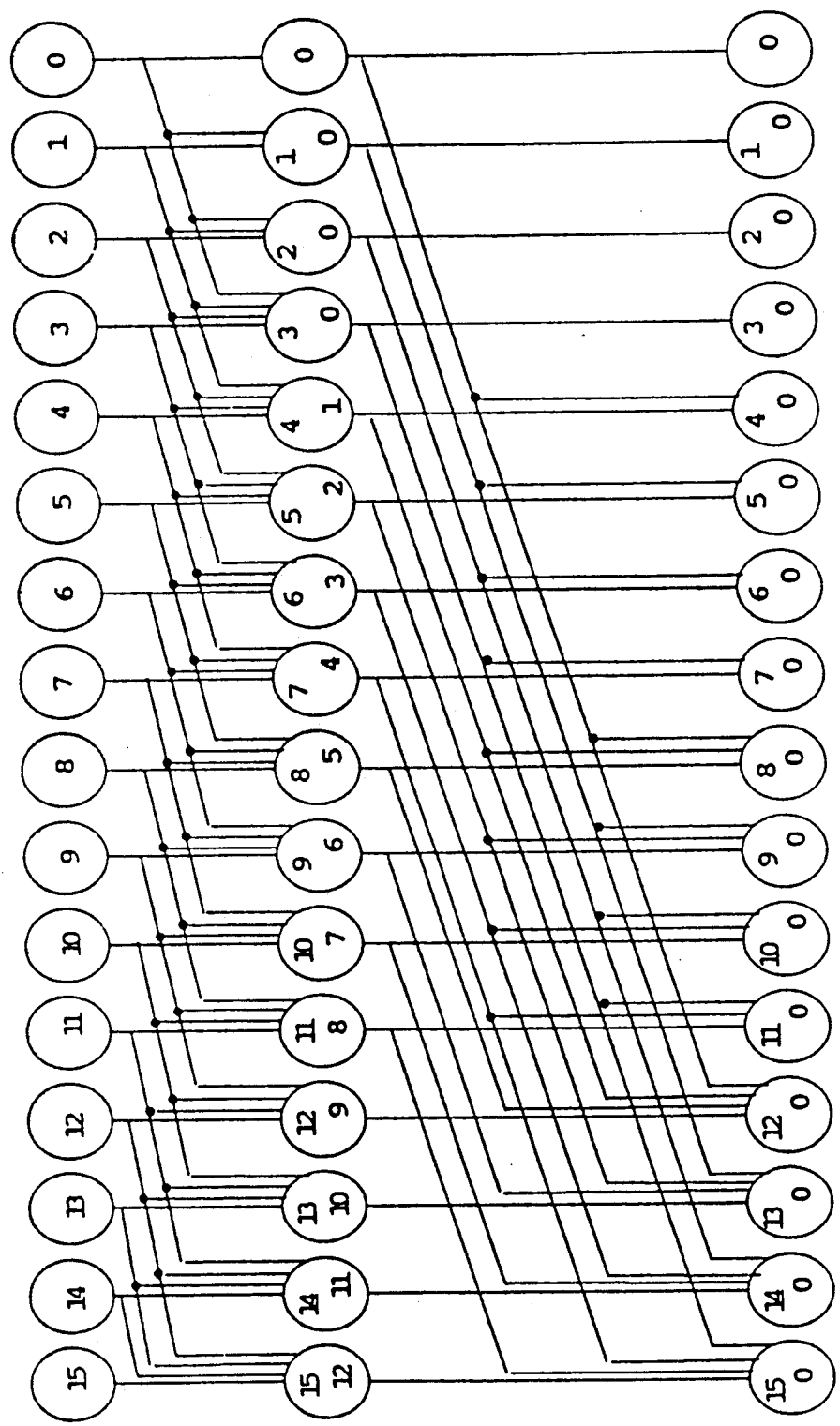
FIGS. 14A and 14B are circle and tally diagrams for a new fast carry circuit and method in accordance with my invention, as discussed in Example 1.
Figure 14B:
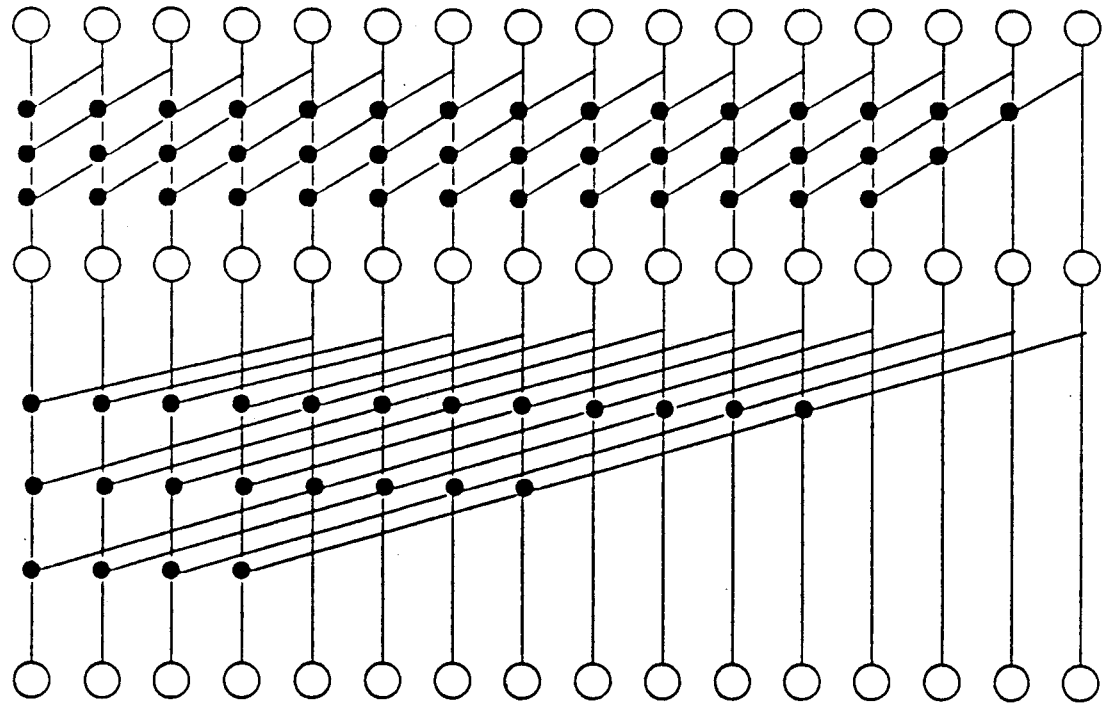
Figure 15A:
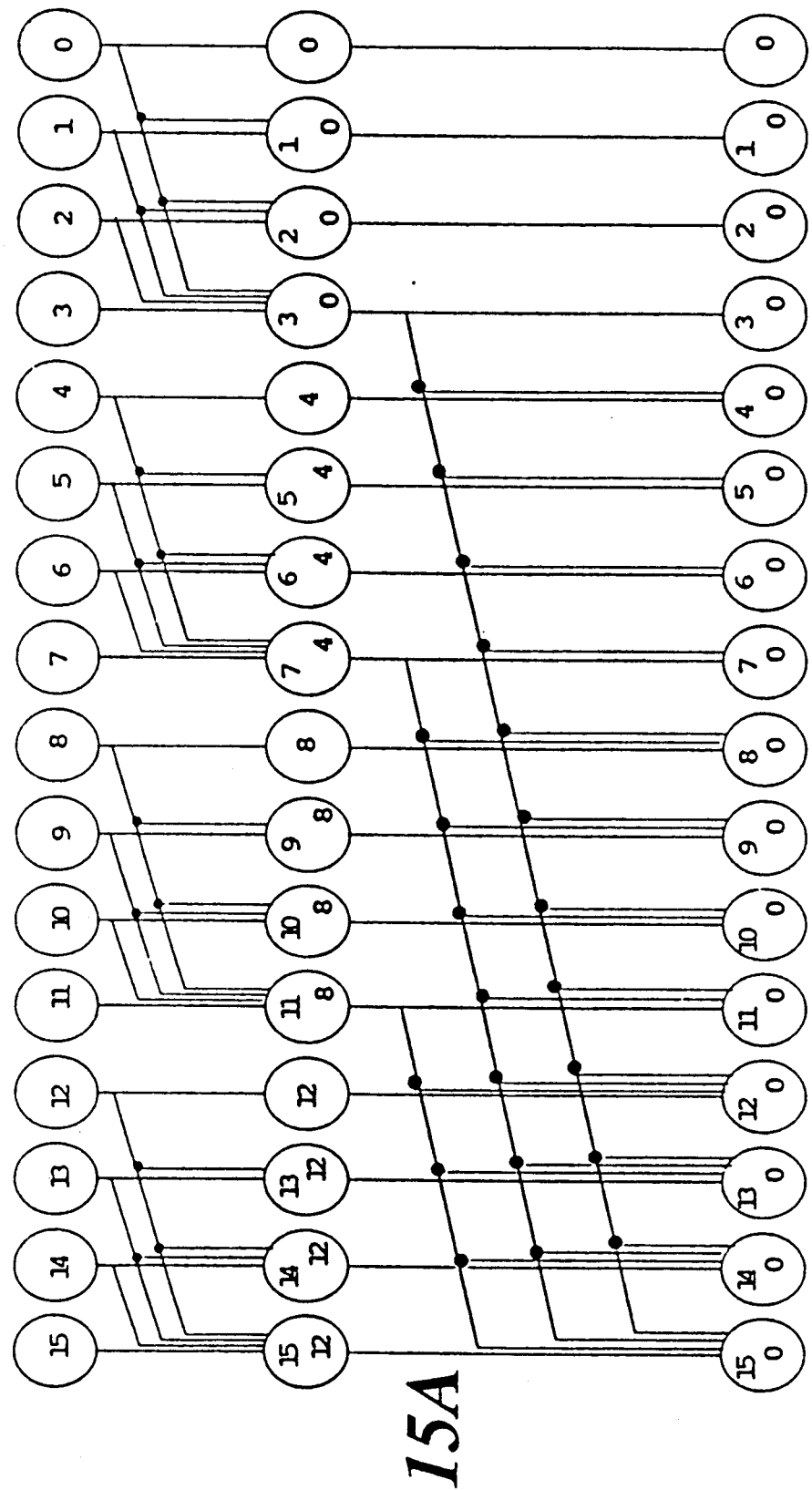
FIGS. 15A and 15B are circle and tally diagrams for a new fast carry circuit and method in accordance with my invention, as discussed in Example 2.
Figure 15B:
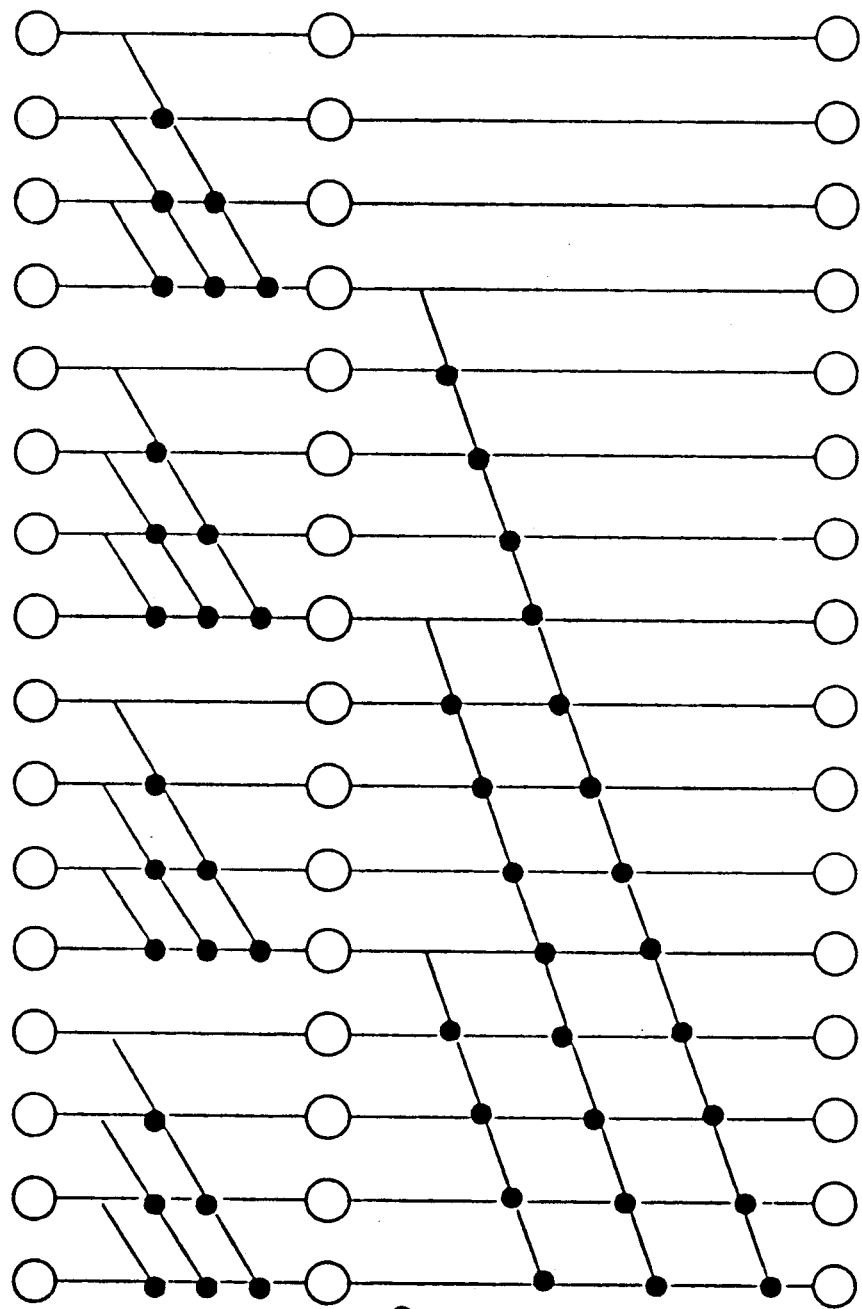

This example, depicted in the circle and tally diagrams of FIGS. 15A and 15B, also requires only ceil[$\log_b N$] stages, but not nearly so many wires as the carry circuit of FIGS. 14A and 14B. The reduction in number of wires is achieved by allowing a higher fan-out (up to 13), while maintaining the same maximum fan-in (4) as in Example 2.

One way to reduce fan-out is to employ parallel duplicate cells at locations which would otherwise have a high fan-out, with each of the duplicate cells having the same inputs and providing the same outputs to some of the receiving gates. Thus, referring to FIG. 15A, maximum fan-out could be limited to 9 by using duplicate cells at the 3,0 circle of the second stage, or limited to 7 by using duplicate cells at both the 3,0 and 7,4 circles of the second stage.

EXAMPLE 3

Figure 16:
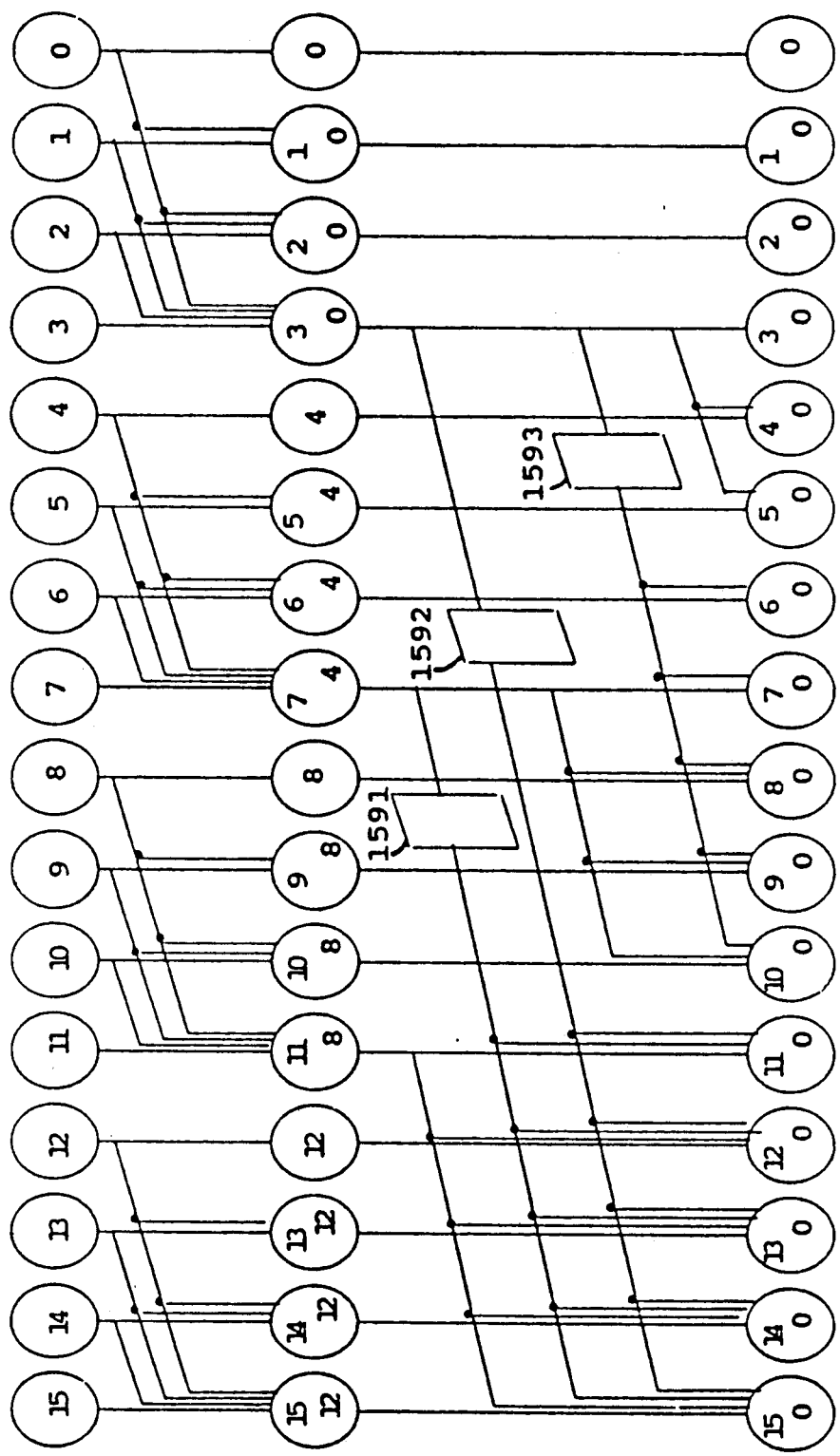
FIG. 16 is a circle diagram for a new fast carry circuit in accordance with my invention which is similar to that of FIG. 15B with the addition of buffers, as discussed in Example 3.

This example, depicted in the circle diagram of FIG. 16, shows another way in which a high fan-out can be employed to reduce wires in constructing a carry circuit in accordance with my invention when the gates used have a more limited fan-out capability. This made possible by the use of a regeneration circuit, sometimes called a buffer, such as the regeneration circuits 1591–1593 in FIG. 16. For example, an OR gate with a single input can be used as a regeneration circuit. Although the use of such regeneration circuit introduces some delay, they do not introduce as much delay as a full stage, and therefore do not reduce the speed as much as the addition of another stage would.

EXAMPLE 4

Figure 17B:
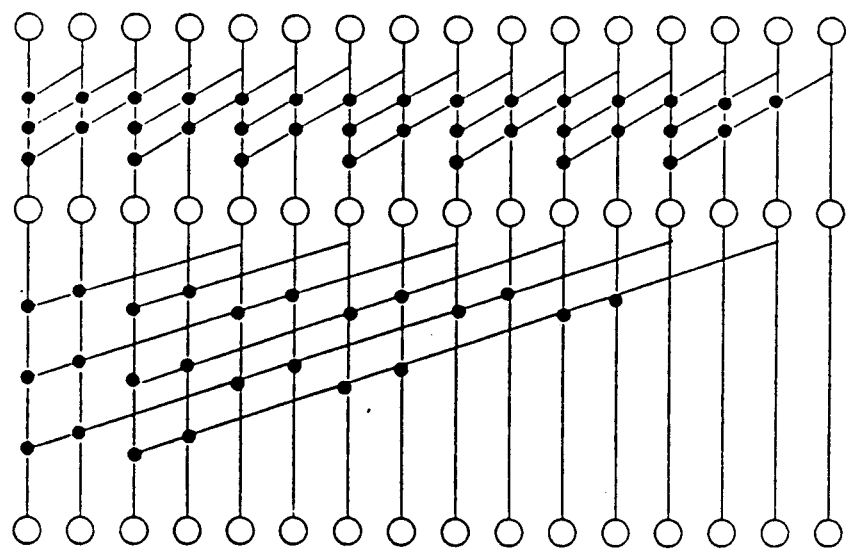
FIGS. 17A and 17B are circle and tally diagrams of another new fast 16 bit carry circuit and method in accordance with my invention, as discussed in Example 4.
Figure 17A:
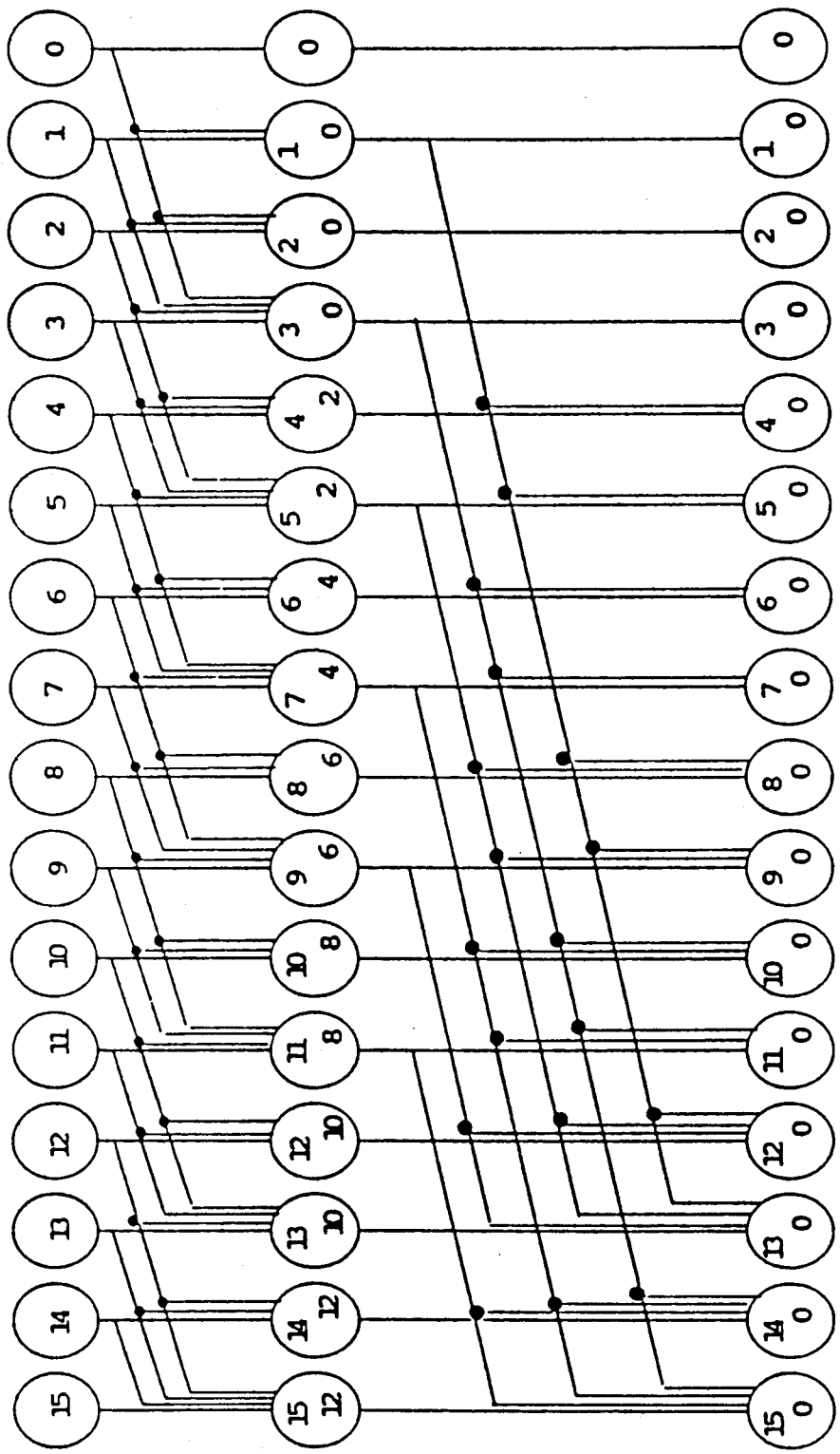

This example of a new fast carry circuit, shown in FIGS. 17A and 17B, also requires only ceil[$\log_b N$] stages. It is intermediate between Examples 1 and 2 in terms of the number of wires and fan-out (7 max.)

EXAMPLE 5

Figure 18:
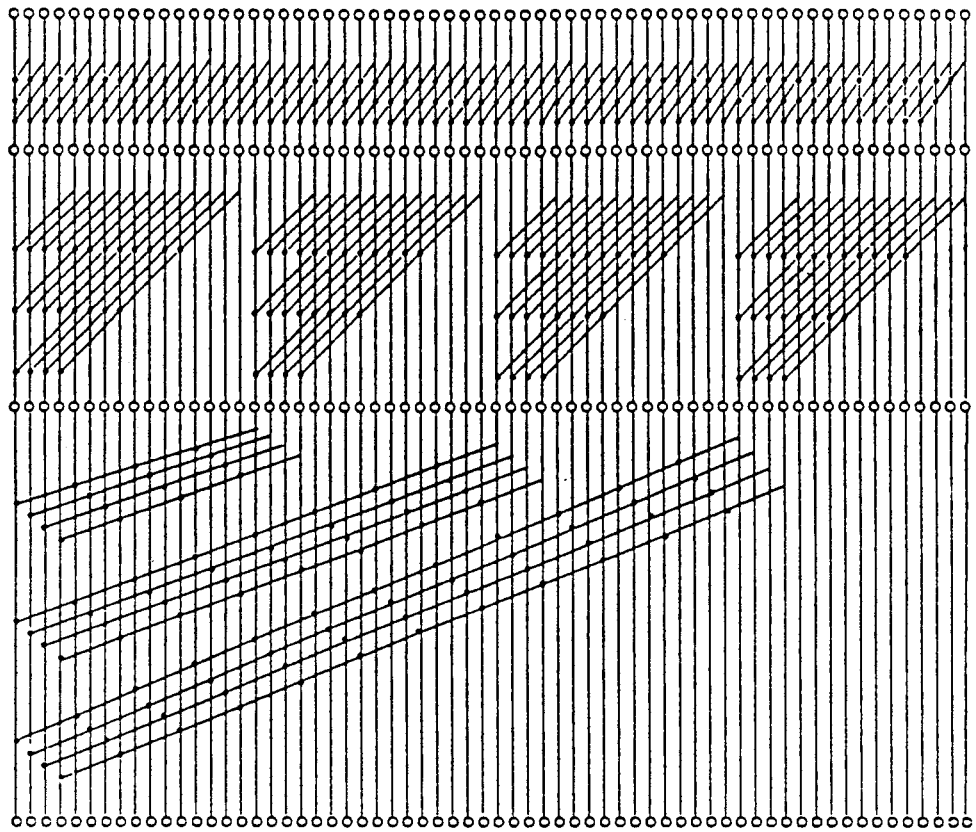
FIG. 18 is a tally diagram of a new fast 64 bit carry circuit and method in accordance with my invention, as discussed in Example 5.

The tally diagram for a 64 bit carry circuit is shown in FIG. 18. The first stage of this carry circuit uses the approach of Example 1, limiting the maximum fan-out to 4. The second and third stages use the approach of Example 2, in which the fan-out is increased (13 max.) and the number of wires decreased. By combining these approaches, the large number of wires of a 64 bit carry circuit using only the approach of Example 1, is avoided. Also the large fan-out of a 64 bit carry circuit using only the approach of Example 2 is also avoided. Of course, buffers or parallel duplicate cells could be incorporated in this embodiment, as discussed in connection with Examples 2 and 3, without departing from my invention.

EXAMPLES 6 and 7

Figure 19:
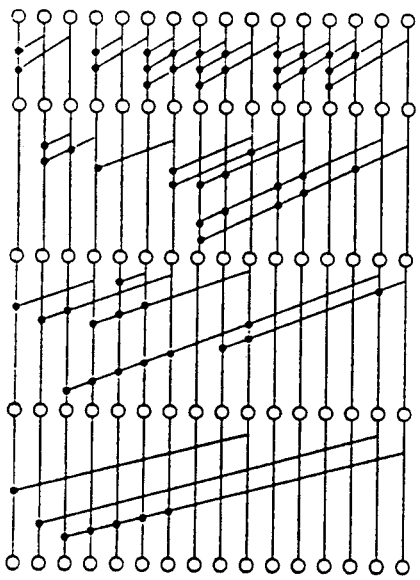
FIG. 19 is a tally diagram of another new 16 bit carry circuit and method in accordance with my invention, as discussed in Example 6.
Figure 20:
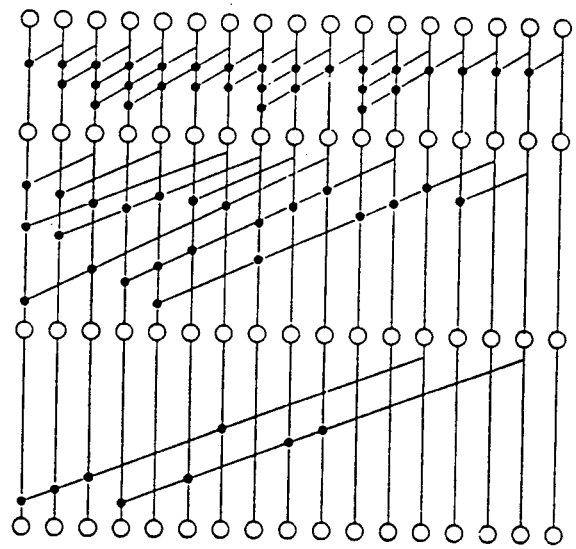
FIG. 20 is a tally diagram of another new 16 bit carry circuit and method in accordance with my invention, as discussed in Example 7.

In Examples 6 and 7, shown in FIGS. 19 and 20, respectively, two other new carry circuits have been designed by use of tally diagrams to demonstrate the utility of this method and the range of carry circuits which can be designed in accordance with my invention. A random number generator was used to generate a series of numbers within a desired range of fan-in (four or less in these examples). This series of numbers was used to determine the number of dots to place on each of the linear segments of these tally diagrams. The resulting diagrams are shown in FIGS. 19 and 20. Notice that the carry circuit of FIG. 20, generated in this way, is as fast as the carry look-ahead circuit of Analysis B and is on the same order of complexity.

In the discussion so far, no provision has been made for a carry-in ($C_0$) to the lowest order bit position. Of course, it is often unnecessary to provide for such a carry-in where the position is the lowest ordered bit in the system.

One way to provide such a carry-in ($C_0$) is to change the definition of $G_0$. Recall that in general, $G_k = A_k B_k$. If there is a carry-in, $G_0$ can be defined as follows:

$$G_0 = A_0 B_0 + A_0 C_0 + B_0 C_0 \tag{18}$$

A disadvantage of handling the carry-in this way is that $G_0$ will then take longer to compute than the other $G_k$ and this will slow down many carry circuits.

Another way to handle the carry-in is to use an N+1 column carry circuit for adding N bit numbers instead of an N column carry circuit. The two numbers to be added are positioned in the left N columns (positions 1 through N) and the carry-in is positioned in the right most column (position 0). Then for k>0, define $G_k$ in the usual way, but for k=0, define $G_0 = C_0$. Depending on the value of N and the structure of the carry circuit considered, it may not be slower to use an N+1 bit carry circuit than an N bit carry circuit. This is how the carry look-ahead circuits handle the carry-in.

The method and apparatus described here includes many new carry circuits which are both practical to implement in VLSI circuits and are up to nearly twice as fast as carry look-ahead circuits. The fastest of the new carry circuits are faster than any carry circuit I am aware of and achieve the theoretical bound for the fastest possible adder. My method makes it very easy to create new adders, each with its own properties. Thus it is now easy to construct an add circuit with properties appropriate for any given situation.

I claim:

1. An N bit carry generate circuit for use in adding two digital signals comprising a plurality of combinatorial logic cells for producing carry-generate signals and carry-propagate signals, each of said logic cells having a fan-in not greater than b, wherein b is greater than 2 and N is greater than 2b, said cells being grouped in a plurality of successive stages, the logic cells of the same stage producing carry-generate signals and carry-propagate signals substantially within the same time period; and interconnection circuitry for selectively applying the carry-generate and carry-propagate signals from the logic cells within each stage to inputs of logic cells of any succeeding stages, wherein the maximum number of stages required to produce a complete set of carry signals is $2 \operatorname{ceil}(\log_b N) - 2$.

2. The N bit carry generate of claim 1 wherein said logic cells are logically arranged in columns, the output carry-generate and carry-propagate signals from each cell for column k is for an interval (k,j) where j is a column less than or equal to k and the value of j may or may not be different for 2 different stages, and if j=0, the carry-propagate signal need not be produced.

3. The N bit carry generate circuit of claim 2 wherein the outputs of more than half of the columns of the first stage each represents an interval of greater than one column.

4. The N bit carry generate circuit of claim 3 wherein at each cell in each stage after the first stage, as many intervals as permitted by the fan-in allowed by that cell are combined for each column k until the interval for each column k is (k,0).

5. The N bit carry generate circuit of claim 2 wherein the outputs of all of the columns of the first stage, except the lowest ordered column, each represent an interval of greater than one column.

6. The N bit carry generate circuit of claim 5 wherein at each cell in each stage after the first stage, as many intervals as permitted by the fan-in allowed by that cell are combined for each column k until the interval for each column k is (k,0).

7. The N bit carry generate of any of claims 1, 3 or 5 wherein the interconnection circuitry is configured such that each of the final carry signals is produced at the output of a logic cell in the $\operatorname{ceil}(\log_b N)$ stage or an earlier stage.

8. A parallel digital adder circuit for addition of two numbers A and B to produce a sum S comprising a carry generate circuit in accordance with any of claims 1, 3 or 5 for calculation of the carry bits $C_k$, where k is the bit position, in combination with a simple adder for the addition of the numbers $A_k$, $B_k$, and $C_k$.

9. The N bit carry generate circuit of claim 2 wherein the maximum fan-in for logic cells of the first stage is b' and carry-generate and carry-propagate signals are produced at a logic cell in each column k for the interval (k, max {0, k+1−b'}).

10. The N bit carry generate circuit of claim 9 wherein the maximum fan-in for logic cells of the second stage is b'' and carry-generate and carry-propagate signals are produced at a logic cell in each column k for the interval (k, max {0, k+1−b'b''}).

11. The N bit carry generate circuit of claim 9 wherein at each logic cell in each stage after the first stage, as many intervals as are permitted by the cell's fan-in are combined for each column k until the interval for each column k is (k,0).

12. The N bit carry generate circuit of claim 2 wherein the outputs of more than half of the columns of the second stage each represents an interval of greater than one column.

13. The N bit carry generate circuit of claim 2 wherein the outputs of all of the columns of the second stage, except the lowest ordered column, each represent an interval of greater than one column.

14. The N bit carry generate of claim 13 wherein the outputs of more than half of the columns of the first stage each represents an interval of greater than one column.

15. The N bit carry generate circuit of claim 2 wherein at each cell in each stage after the first stage, as many intervals as permitted by the fan-in allowed by that cell are combined for each column k until the interval for each column k is (k,0).

16. The N bit carry generate circuit of claim 1 further comprising at least one regeneration circuit in the interconnection circuit between two stages, said regeneration circuit being connected to receive a signal from one of the logic cells of the stage preceding said regeneration circuit and to transmit the signal to a plurality of logic cells of the succeeding stage.

17. The N bit carry generate circuit of claim 16 wherein the delay caused by the operation of said regeneration circuit is less than the typical delay of one stage of the carry generation circuit.

18. A method of operation of a digital adder for the digital addition of two numbers A and B to produce a sum S comprising the steps of calculating the carry bits $C_k$ by use of a plurality of logic cells, where k is the column position within the numbers being added and $C_k$ is the carry bit from the preceding column, and adding $A_k$, $B_k$ and $C_k$, the improvement comprising calculation of the carry bits $C_k$ in a sequence of not more than $2\operatorname{ceil}(\log_b N) - 2$ successive stages, where b is the maximum number of columns of information to be combined in a single logic cell, b is greater than 2, N is the total number of columns, and in each stage, carry-generate and carry-propagate signals are produced substantially within the same time period for all columns for which the carry bit into the next column has not yet been determined.

19. The method for digital addition of claim 18 characterized by the production of each of the final carry bits $C_k$ at the output of the $\operatorname{ceil}(\log_b N)$ stage or an earlier stage.

20. The method for digital addition of claim 19 characterized by the combination in each column be of as many intervals as possible up to b until the interval for each column k is (K,0).

21. An N bit carry generate circuit for use in an adder having a first circuit for receiving two digital signals A and B and producing generate and propagate signals, a carry generate circuit, and a combinatorial circuit for receiving the propagate signals from the first circuit and carry signals from the carry generate circuit and for producing the sum of A and B, said carry generate circuit comprising a plurality of combining logic cells arranged in successive stages, each of said logic cells receiving at least two and not more than b generate signals, where b is the fan-in of a logic cell, and not more than b propagate signals, producing a combined generate signal from all of said logic cells; producing a combined propagate signal from at least some of said logic cells; wherein the maximum number of combining logic cells in any signal path is less than or equal to $2\operatorname{ceil}(\log_b N) - 2$.

22. The carry generate circuit of claim 21 wherein the number of logic cells in the first stage is greater than N/2.

23. The carry generate circuit of claim 22 wherein at each column position of a stage after the first stage, b carry-generate signals and b carry-propagate signals are combined by a logic cell unless the carry-generate signal $G_{k,0}$ is produced in that or a preceding stage.

24. The carry generate circuit of claim 21 wherein the number of logic cells in the first stage is $N-1$.

25. The carry generate circuit of claim 24 wherein at each column position of a stage after the first stage b carry-generate signals and b carry-propagate signals are combined by a logic cell unless the carry-generate signal $G_{k,0}$ is produced in that or a preceding stage.

26. The carry generate circuit of claim 21 wherein at each column position k greater than $k=0$ of the first stage the logic cell produces either the carry-generate signal $G_{k,0}$, or both the carry-generate signal $G_{k,k+1-b}$ and the carry-propagate signal $P_{k,k+1-b}$.

27. The carry generate circuit of claim 20 wherein at each column position of a stage after the first stage b carry-generate signals and b carry-propagate signals are combined by a logic cell unless the carry-generate $G_{k,0}$ is produced in that or a preceding stage.

28. The carry generate circuit of claim 21 wherein the number of logic cells in the second stage is greater than $N/2$.

29. The carry generate circuit of claim 21 wherein a combining logic cell exists in the second stage for each column position k greater than $k=0$ unless the carry-generate signal $G_{k,0}$ is produced in a preceding stage.

30. The carry generate circuit of claim 29 wherein the number of logic cells in the first stage is greater than $N/2$.

31. The carry generate circuit of claim 21 wherein at each column position of a stage after the first stage b carry-generate signals and b carry-propagate signals are combined by a logic cell unless the carry-generate signal $G_{k,0}$ is produced in that or a preceding stage.

32. The carry generate circuit of any of claims 21, 22, 24, 26, 28 or 29 wherein the carry generate signals $G_{k,0}$ are produced for each column k greater than $k=0$ at stage $\text{ceil}(\log_b N)$ or an earlier stage.

* * * * *